United States Patent [19]

Altman et al.

[11] Patent Number: 5,517,578
[45] Date of Patent: May 14, 1996

[54] METHOD AND APPARATUS FOR GROUPING AND MANIPULATING ELECTRONIC REPRESENTATIONS OF HANDWRITING, PRINTING AND DRAWINGS

[75] Inventors: Dan Altman, Kula, Hi.; Steven R. Kusmer, San Francisco, Calif.; Gregory Stikeleather, Palo Alto, Calif.; Michael P. Thompson, San Carlos, Calif.

[73] Assignee: aha! software corporation, Mountain View, Calif.

[21] Appl. No.: 64,954

[22] Filed: May 20, 1993

[51] Int. Cl.$^6$ .............................. G06T 7/60; G06F 17/21
[52] U.S. Cl. .............................. 382/181; 395/3; 395/145; 395/161; 395/900; 345/173; 345/179; 364/419.17; 382/176; 382/177; 382/178; 382/179; 382/180; 382/182; 382/186; 382/187; 382/189; 382/190; 382/199; 382/200; 382/203
[58] Field of Search .............................. 395/144, 145–149, 395/154, 900, 155–161; 382/9, 13, 48, 57, 173, 176–179, 180, 181–182, 185–187, 189–190, 199–200, 202–203; 345/179–183, 126; 364/419.17

[56] References Cited

U.S. PATENT DOCUMENTS

| | | | |
|---|---|---|---|
| 4,024,500 | 5/1977 | Herbst et al. | 382/178 |
| 4,680,804 | 7/1987 | Kuzunuki et al. | 382/185 |
| 4,718,103 | 1/1988 | Shojima et al. | 382/189 |
| 4,727,588 | 2/1988 | Fox et al. | 382/13 |
| 4,755,955 | 7/1988 | Kimura et al. | 364/518 |
| 4,763,356 | 8/1988 | Day, Jr. et al. | 379/368 |
| 4,860,372 | 8/1989 | Kuzunuki et al. | 382/13 |
| 4,910,785 | 3/1990 | Nakatsuma | 382/176 |
| 4,953,225 | 8/1990 | Togawa et al. | 382/13 |
| 4,965,678 | 10/1990 | Yamada | 358/452 |
| 5,001,765 | 3/1991 | Jeanty | 382/179 |
| 5,063,600 | 11/1991 | Norwood | 382/13 |
| 5,138,668 | 8/1992 | Abe | 382/9 |
| 5,155,813 | 10/1992 | Donoghue et al. | 395/275 |
| 5,157,737 | 10/1992 | Sklarew | 382/13 |
| 5,204,959 | 4/1993 | Sakuragi | 395/600 |
| 5,208,906 | 5/1993 | Morgan | 395/148 |
| 5,220,649 | 6/1993 | Forcier | 395/148 |
| 5,231,579 | 7/1993 | Tsuchiya et al. | 364/419 |
| 5,245,445 | 9/1993 | Fujisawa | 358/458 |
| 5,252,951 | 10/1993 | Tannenbaum et al. | 345/156 |
| 5,260,697 | 11/1993 | Barrett et al. | 345/173 |
| 5,272,764 | 12/1993 | Bloomberg et al. | 382/9 |
| 5,276,794 | 1/1994 | Lamb, Jr. | 395/149 |
| 5,321,768 | 6/1994 | Fenrich et al. | 382/178 |
| 5,321,770 | 6/1994 | Huttenlocher et al. | 382/22 |
| 5,347,295 | 9/1994 | Agulnick et al. | 345/156 |
| 5,384,864 | 1/1995 | Spitz | 382/9 |
| 5,396,566 | 3/1995 | Bruce et al. | 382/187 |

OTHER PUBLICATIONS

Brochure By Concept Technologies, Inc., for "Stroke of the Hand," 1992.

Gary E. Kopec and Steven C. Bagley, "Editing Images of Text," Proceedings of the International Conference on Electronic Publishing, Document Manipulation & Typography, Gaithersburg, Maryland, Sep. 1990, pp. 207–220.

Primary Examiner—Heather R. Herndon
Assistant Examiner—Joseph H. Feild
Attorney, Agent, or Firm—Greg T. Sueoka

[57] ABSTRACT

A note taking system that integrates word-processing functionality and computerized drawing functionality for processing ink strokes comprises novel methods that provide this functionality such as: a method for modeless operation of the note taking system that automatically switches between providing word-processing functionality and drawing functionality; a novel method for processing ink strokes as drawings, a unique method for processing ink strokes as writing, and other methods for parsing the ink strokes into words, lines, and paragraphs. The present invention also includes additional methods for manipulating figures such as a division between line and shape type figures, and a special handle performing either rotation or re-sizing.

43 Claims, 24 Drawing Sheets

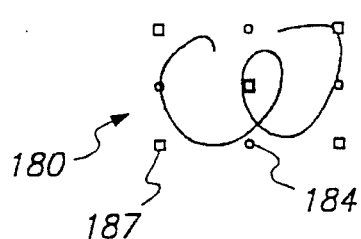 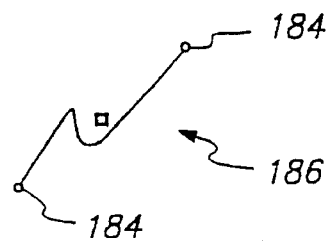
FIG. 9A    FIG. 9B
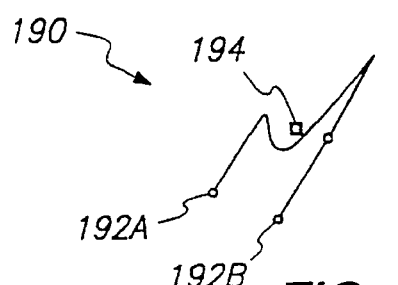 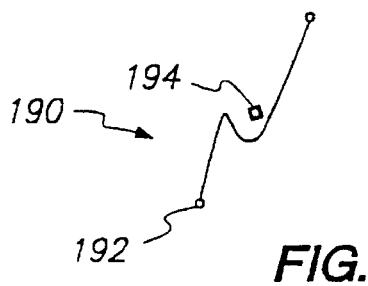
FIG. 10A    FIG. 10B
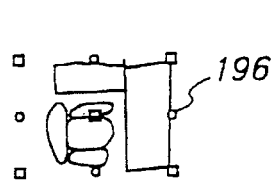 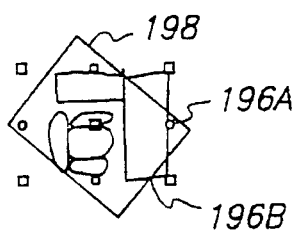 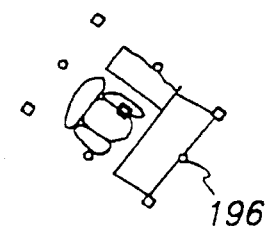
FIG. 11A    FIG. 11B    FIG. 11C
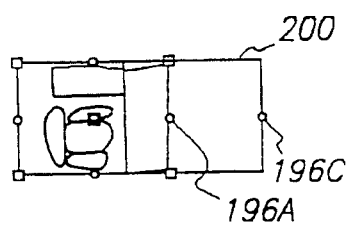 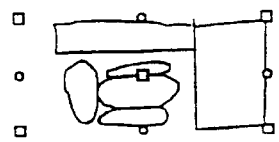
FIG. 12A    FIG. 12B
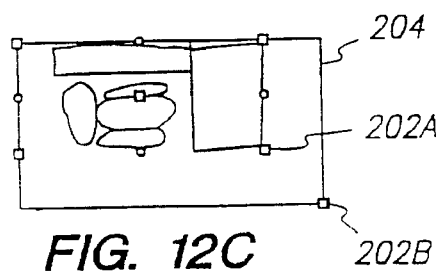 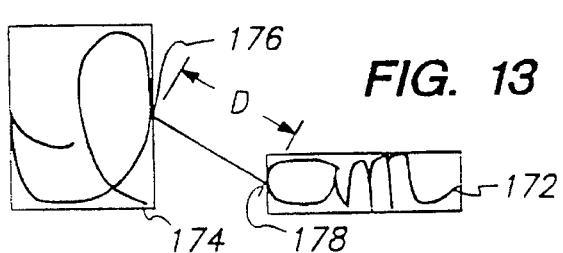
FIG. 12C    FIG. 13

A  B  C  D

*This is a sample paragraph which wraps from line to line. This next line wraps too.*
　*This line doesn't wrap because it doesn't begin under the line before.*

```
        A           B        C             D
    ┌─────────────────────────────────────────┐
    │         .        .        .             │
    │─────────────────────────────────────────│
    │  —   Bullet paragraph one which         │
    │      wraps onto another line.           │
    │  —   Bullet paragraph two.              │
    │  —   Bullet paragraph three which       │
    │      wraps onto another line.           │
    │         .        .        .             │
    │         .        .        .             │
    └─────────────────────────────────────────┘
            1/3      1/2      2/3
```

FIG. 16B

METHOD AND APPARATUS FOR GROUPING AND MANIPULATING ELECTRONIC REPRESENTATIONS OF HANDWRITING, PRINTING AND DRAWINGS

BACKGROUND OF THE INVENTION

1. Field of the Invention

The present invention relates generally to methods for performing pen-based computing, and in particular, to a method and apparatus for grouping and manipulating ink stroke representations. Still more particularly, the present invention relates to a note taking system that provides for simplified user manipulation of handwritten and printed ink strokes as characters and words in a word-processing system as well as the improved manipulation of other ink strokes as graphical images as in computer drawing programs.

2. Description of Related Art

Pen-based computers in which the pen replaces the keyboard as the primary input device have become well known. Such systems provide a digitizing pad and pen for the user to input information. The information is input in the form of strokes or graphic representations of strokes. The computer monitors the movement of the pen and creates a stroke when the pen comes within a pre-defined proximity or contact of the digitizing pad. The computer follows the movement of the pen across the digitizing pad while simultaneously extending the stroke, and ends the stroke when the pen is removed or moved away from the digitizing pad.

While programs have been created for converting pen-based input into characters, they are limited because they typically can only covert the input when the characters are written in distinctly separated boxes or positions. One of the continuing problems has been how to divide the input where the user enters several strokes just as if he/she were writing upon a blank sheet of paper. In fact, existing systems only store the ink strokes, and do not allow the user to perform editing tasks upon the ink images. There is no grouping of the ink strokes by paragraph and/or word to allow the user to perform standard word-processing functions. For example, there is no word wrapping (a common feature in word-processing programs) for the ink images.

One of the major problems in processing ink strokes is that there are a variety of writing styles. This makes differentiating between words, lines and paragraphs extremely difficult. Most computers do not separate ink strokes into words because the spacing between characters can vary greatly depending on the writing style of the person inputting the data. Existing computers are not able to separate lines of ink written data because with handwriting and printing there are several characters that are written below a line such as the characters "j", "y", and "g". Additionally, users are not precise in writing in a strict horizontal direction between lines. Finally, unlike systems with keyboards, there is no return or enter key. Thus, there is no demarcation by user when paragraphs are ending and beginning. Therefore, there is a need for a system that can be used with pen-based computers to provide the full functionality of word-processing programs on graphical representations of handwriting.

Another problem with existing pen-based computing systems is the ability to use word-processing functionality and drawing/graphic functionality interchangeably. When pen and paper are used for the drawing of figures or for the writing (or printing) of text, the user switches between drawing and writing operations seamlessly. However, in both keyboard-based computers and pen-based computers, the user must typically switch between application programs. This often entails entering several keystrokes or commands to switch the computer between modes of operation. This becomes very burdensome because pen-based computers are intended to be used in environments where the user often switches been drawing operations and word-processing operations hundreds of times per document. An added problem is that since the drawing and word-processing are two different applications, they also have different user interfaces, and thus, different formats for commands. Thus, there is a need for a system that integrates the word-processing and drawing functions into a single application.

Yet another shortcoming of existing pen-based computer systems, and computer drawing packages generally, is that it is very difficult to manipulate figures presented on the display. For example, most graphic/drawing packages provide a very narrow definition of the types of figures that may be considered as line types. Therefore, most figures are restricted to the more limited operations that can be performed on shape types, as opposed to the more appropriate operations performed on line types. Another problem with the prior art is that certain operations such as rotation of a figure are not built into the user interface to make them easily accessible, but can be accessed only by marking and then selecting the operation with specialized tools. This significantly limits the efficiency for the user. Therefore, there is a need for a note taking system that avoids the complications and restrictions of the prior are by providing integrated word-processing functionality and graphic/drawing functionality, and a system that is specifically designed for the pen-based computer environment.

SUMMARY OF THE INVENTION

The present invention overcomes the limitations and shortcomings of the prior art with an improved method for grouping and manipulating electronic representations of handwriting, printing, and drawings. The present invention advantageously provides a note taking system that integrates word-processing functionality and computerized drawing functionality for processing ink strokes. The preferred embodiment of the present invention comprises novel methods that provide this functionality such as: a method for modeless operation of the note taking system that automatically switches between providing word-processing functionality and drawing functionality; a novel method for processing ink strokes as drawings, a unique method for processing ink strokes as writing, and other methods for parsing the ink strokes into words, lines, and paragraphs. The present invention also includes additional methods for manipulating figures such as a division between line and shape type figures, and a special handle performing either rotation or re-sizing.

BRIEF DESCRIPTION OF THE DRAWINGS

FIG. 4 is a block diagram of a preferred embodiment for the note taking system of the present invention;

FIGS. 9A and 9B are graphical representations of a screen display showing a selected shape type and a selected line type figures, respectively;

FIGS. 10A and 10B are graphical representations of a screen display showing the user interface for rotating a line type figure;

FIGS. 11A, 11B, and 11C are graphical representations of a screen display showing the user interface for rotating a shape type figure;

FIGS. 12A, 12B, and 12C are graphical representations of a screen display showing the user interface for re-sizing a shape type figure;

FIG. 13 is graphical representations of a screen display showing strokes with bounding boxes and the distance for calculating a chain link;

FIG. 16A, 16B, and 16C are graphical representations of a screen display illustrating standard paragraph parsing, bullet paragraph parsing, and list paragraph parsing, respectively.

DETAILED DESCRIPTION OF THE PREFERRED EMBODIMENT

Figure 1:
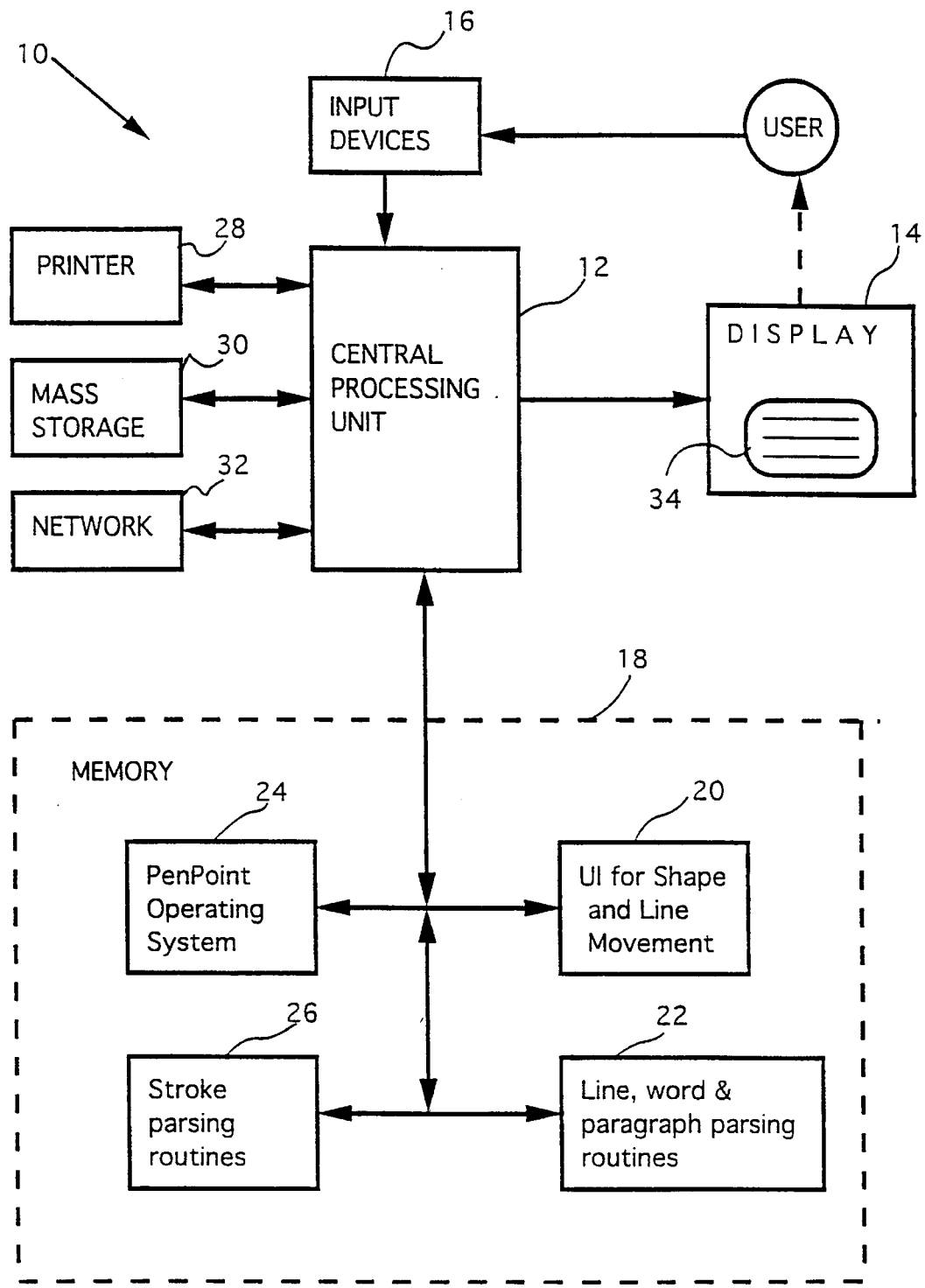

In accordance with the present invention, an apparatus 10 for grouping and manipulating electronic representations of handwriting, printing, and drawings in accordance with the present invention is shown in FIG. 1. A central processing unit 12 (CPU) couples with a display device 14, an input device 16, and a memory 18. The CPU 12 is also coupled to a printer 28, mass storage 30, and a network 32 in a conventional manner. In an exemplary embodiment, the system may be an NCR 3125 pen computer. Electronic ink stroke data is stored in the memory 18 along with program routines 20, 22, 26 and a pen-based operating system 28. The CPU 12, under the guidance of instructions received from the memory 18 and from the user through input device 16, creates and displays representations of drawing figures, handwritten text, printed text, and formatted characters produced from codes. The user creates ink strokes by manipulating a pen-type input device over the screen 34 of the display device 14. The display device 14 further comprises a digitizer or equivalent device for sensing the movement and proximity of the pen-type input device. The CPU 12 uses the stroke parsing routines 26 and writing parsing routines 22 to translate the ink strokes input by the user. The present invention preferably includes the use of pen gestures for the manipulation of ink strokes and character codes such as in the PenPoint Operating System sold by GO Corporation. The user interface routines 20 and CPU 12 are also used to create a user interface for displaying information on the display 20. Those skilled in the art will be aware that various equivalent combinations of devices can achieve the same results when used in accordance with the present invention. For example, while the memory blocks are shown as separate, they can easily comprise different regions of a contiguous space in memory. Also, the present invention may also be used with traditional desktop computers and a mouse or track ball being used as the input device.

The methods of the present invention are particularly advantageous because they provide an environment with the full functionality of a word-processing program and a drawing program. For example, the user can enter either drawing strokes or writing strokes, and the system will process the strokes automatically. Moreover, the present invention provides a consistent user interface for both the word-processing functionality and the drawing functionality. The present invention advantageously presents a series of parallel horizontal lines on the display to represent lines similar to those on a sheet of paper. While the lines are preferably horizontal, those skilled in the art will recognize that the lines may also be vertical for languages such as Japanese, or may even be eliminated by using a blank screen representing a blank sheet of paper. These lines are used in determining the nature (drawing or writing) of an ink stroke, as well as for aligning the display of words. The present invention preferably has an architecture that provides two layers to process and store ink strokes apart from the displayed of strokes on the screen 34. Each of these layers provides a virtual space/layer for each page displayed on the display device 14. First, the present invention provides a drawing layer for processing and storing ink strokes that are found to be more similar to drawing gestures and figures. This layer provides functionality similar to a conventional computer drawing program. Drawing strokes are treated separate from writing strokes to allow manipulations based on the context of drawing. Second, the present invention provides a writing layer for processing and storing ink strokes that are found to be more similar to cursive handwriting or printed text. The writing layer provides the functionality of a word-processing program, however, it operates on ink strokes as well as more traditional computer codes representing characters such as ASCII. In the writing layer, strokes are grouped as words for wrapping, deleting, moving, copying and translating.

Figure 2A:
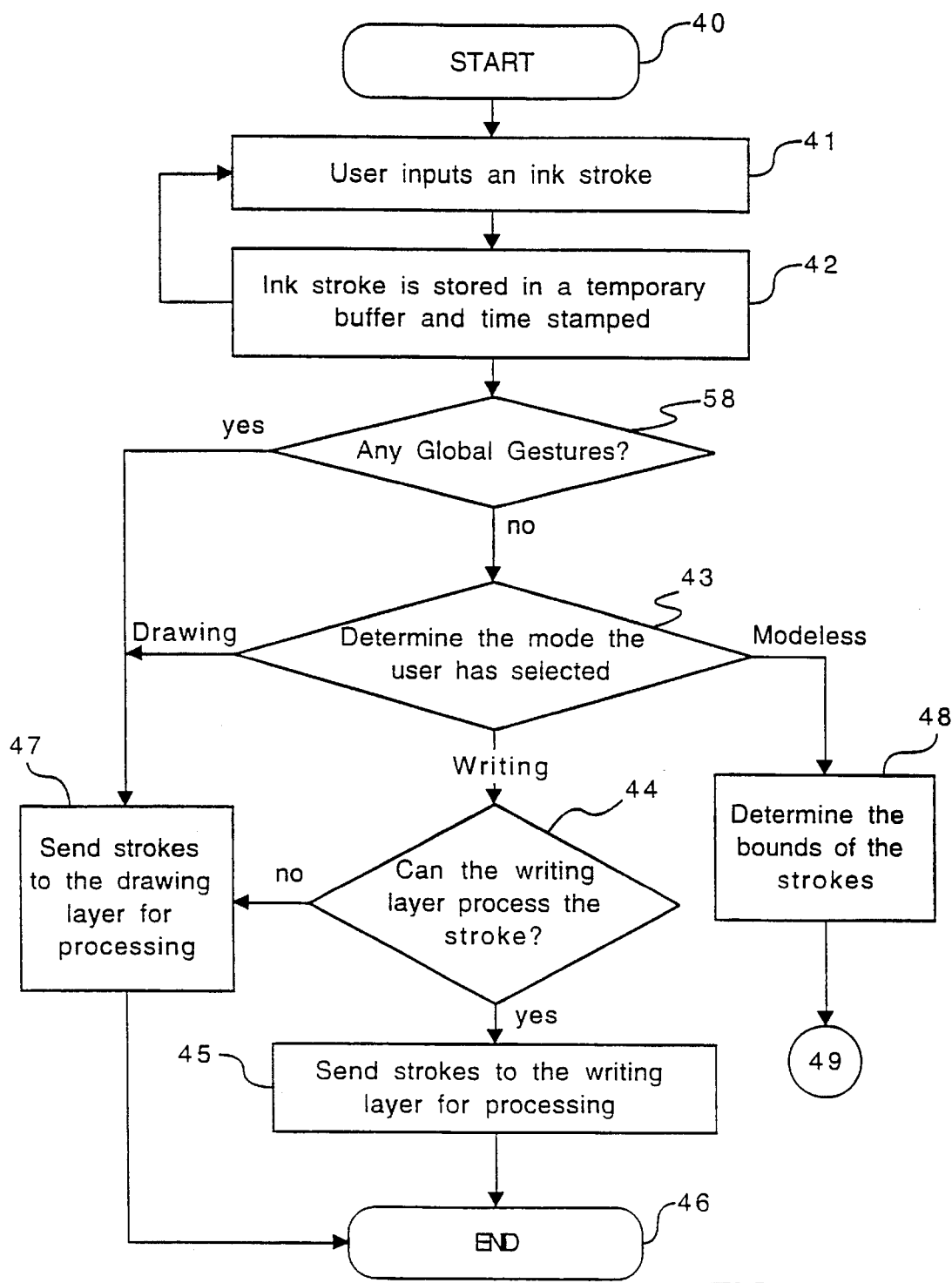
FIGS. 2A and 2B are a flowchart of the preferred method for processing ink strokes input to the note taking system of the present invention.
Figure 2B:
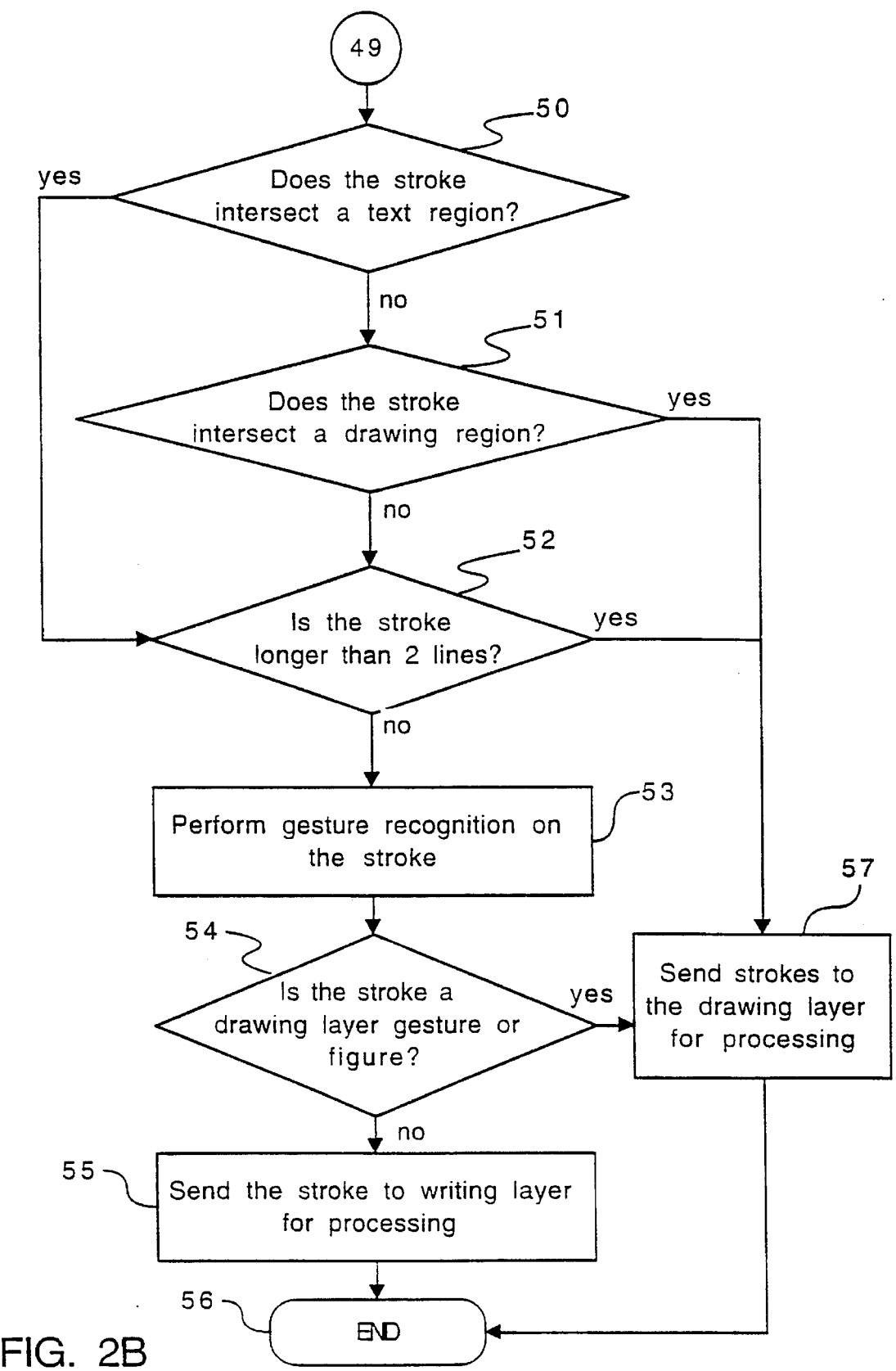

Referring now to FIGS. 2A and 2B, the preferred method for the operation of the note taking system of the present invention will be described. The note taking system advantageously provides three modes of operation: the writing mode, the drawing mode, and the smart ink mode. The mode may be selected by user manipulation of the input device 16 to select one of the three operational modes from buttons on a menu bar. In the writing mode, all the strokes are passed to the writing layer for further processing. Similarly, in the drawing mode, all the strokes are passed to the drawing layer for further processing. In the smart ink mode, the note taking system automatically determines whether the writing layer or the drawing layer should process the ink stroke depending on the type of information being input. Under any of the modes, the system allows the user to process and manipulate some ink strokes with the drawing layer while processing other strokes with the writing layer. However, for each definable area or region of the display, it is designated either a drawing region, a writing region, an undeclared region, or an overlapping writing and drawing region.

The operation of the note taking system can be best be understood with reference to FIGS. 2A and 2B. The process begins in step 41 with the user entering an ink stroke with the input device 16. In step 42, the ink stroke is preferably time stamped to identify the order in which strokes are input into the system, and then stored in a temporary buffer. For example, the ink strokes may be store in the buffer in the order the are received. Additional strokes can be input and stored as the system loops through steps 41 and 42. After a predetermined amount of time, once the buffer is full, or once the pen goes out of proximity, the system proceeds to step 58 to determine whether any of the strokes entered are global gestures. Examples of global gestures include Double Up Caret, Double Circle, and Circle Cross Out. These global gestures are targeted to the operating system layer as a default for handling. Thus, as a global gesture is entered the method jumps to step 47 for processing by the drawing layer, otherwise the method continues in step 43. Next in step 43, the method determines the mode of operation that the user has selected. If the writing mode is selected, then the process continues in step 44 where the system tests whether the strokes can be processed by the writing layer. Certain strokes and gestures can only be processed by the drawing layer. Therefore, the present invention first tests whether the writing layer can process the stroke. All strokes that can be processed by the writing layer are sent to the writing layer in step 45, and the process ends in step 46. Any other strokes are sent to the drawing layer in step 47, and the process ends in step 46. If the drawing mode is selected, then the process moves from step 43 to step 47 where the strokes stored in the temporary buffer are sent to the drawing layer for further processing as described below, and the process ends in step 46.

The present invention advantageously provides the third mode of operation, smart ink mode, that automatically determines whether to treat the incoming strokes as drawing or writing strokes. If the smart ink mode is selected, then the present invention determines the bounds of the stroke in step 48. Next, in steps 50 and 51, the system tests whether the stroke is being made over a region of the display already designated a drawing or writing/text region. The method could also operate if any stroke was near an already designated area. For example, near may be defined to be within 1 line height. The present invention advantageously assumes that if a stroke of a particular type has already been drawn in the region, then user is probably inputting strokes of the same type. Thus, if the stroke is found to be over a drawing region in step 51, all the strokes are passed to the drawing layer in step 57 and the process ends in step 56. However, if the stroke input is found to be over a text region in step 50, or in an undeclared regions in step 51, then additional features of the stroke are considered in step 52. In step 52, the system tests whether the stroke extends over two line heights vertically. A line height is determined to be the vertical distance between displayed lines present on the screen by the preferred system as a guideline for a line of hand writing. In the preferred system, the user may adjust the spacing between the display lines drawn by the system on the screen using the input device and menu or buttons. For example, the line height may be defined in a variety of types of units such as inches, centimeters or points of a printing type. The present invention advantageously assumes that strokes vertically longer than two line heights (e.g., strokes crossing three lines) are most likely drawing strokes and not writing strokes. Those skilled in the art will realize that the present invention may be modified to test for other vertical dimensions such as 1.5 line heights or 2.5 line heights. Thus, if the stroke is longer than two line heights, the stroke is processed by the drawing layer in step 57. However, if the stroke is not longer than two line heights, gesture recognition is performed on the stroke in step 53. Then in step 54, the system tests whether the stroke is a drawing layer gesture or a figure. The present invention advantageously identifies the gestures and other strokes that are most likely to be drawings with a horizontal line being an example. Other examples include of gestures processed by the drawing layer include Tap Hold, Flick Left, Flick Right, Double Flick Left, Double Flick Right, Right Down and Right Up. If the stroke input matches any of these gestures, the stroke is sent to the drawing layer for further processing in step 57. Otherwise, the stroke or gesture is assumed to be printing or cursive writing, and is sent to the writing layer in step 55 for further processing.

Figure 3:
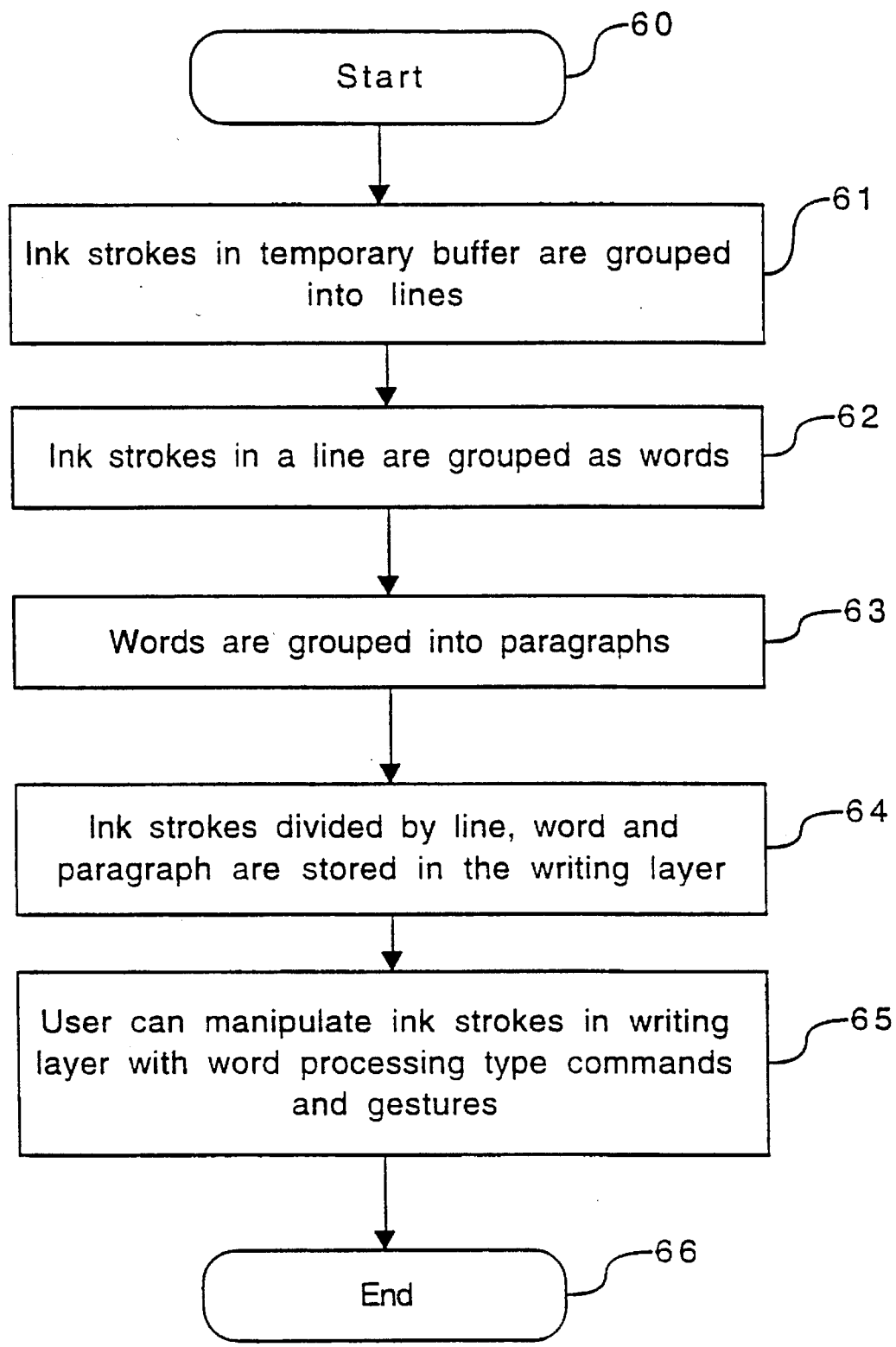
FIG. 3 is a simplified flowchart of the preferred method for processing ink strokes in the writing layer of the present invention.

Once the stroke has been sent to the proper layer, it undergoes additional processing. Referring now to FIG. 3, an overview of the processing performed in the writing layer is shown. First, the ink strokes are grouped into or associated with lines as noted in step 61. A line operates just as a normal writing line on a ruled sheet or paper, and is defined to be the area between two displayed lines drawn by the system on the screen. Then, the ink strokes associated with each line are grouped into words in step 62. Next in step 63, the words are grouped into paragraphs. Once the ink strokes have been properly grouped, they are stored in the writing layer in step 64. Finally in step 65, the ink strokes can be manipulated with word-processing type commands to provide word wrapping, or deletion, movement, or translation by line, word or paragraph. The user might also adjust the paper size, the window size, or the margins causing the writing to be wrapped to fit to space provided.

Figure 4A:
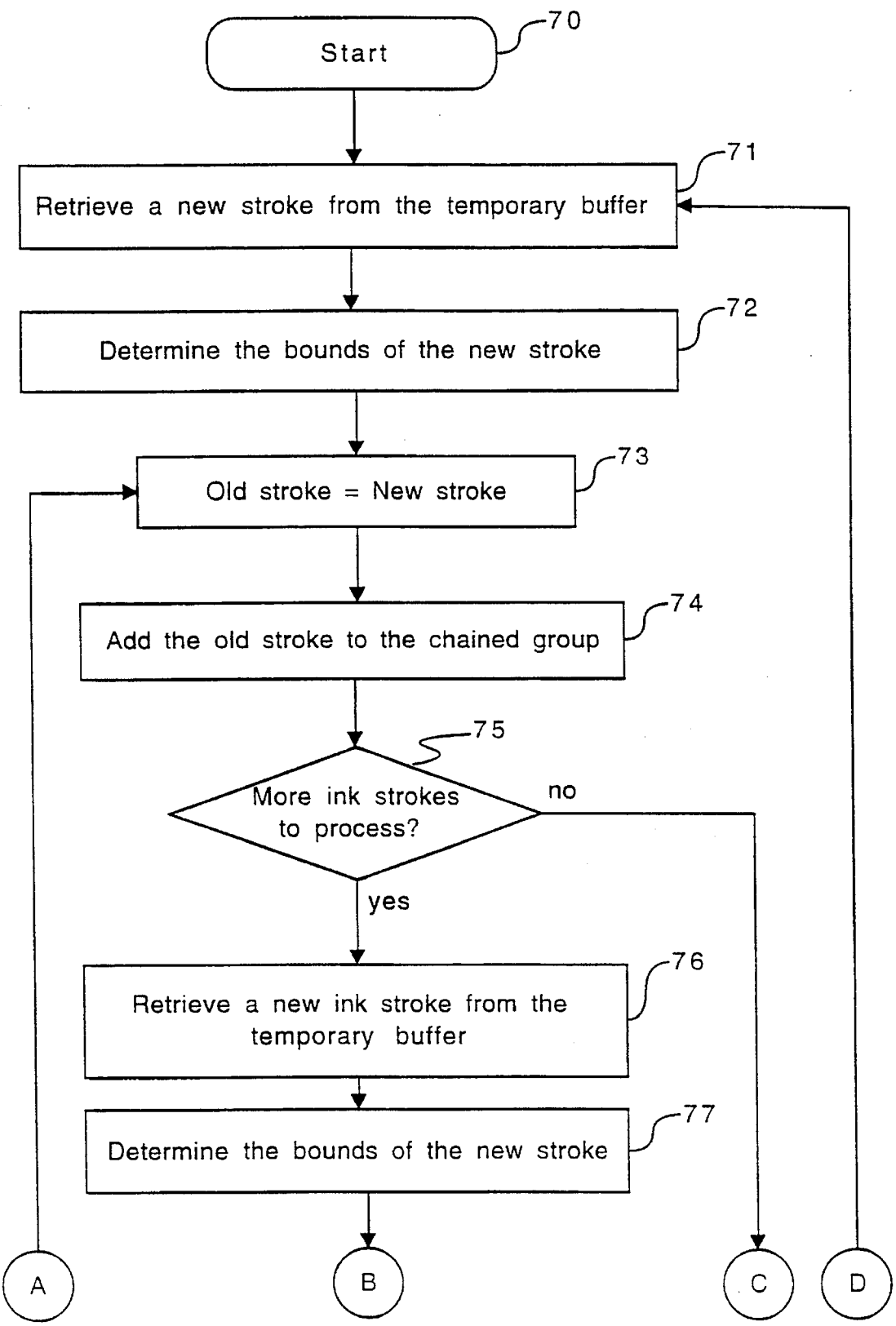
FIGS. 4A and 4B are a flowchart of the preferred method for processing ink stroke inputs into lines according to the present invention.
Figure 4B:
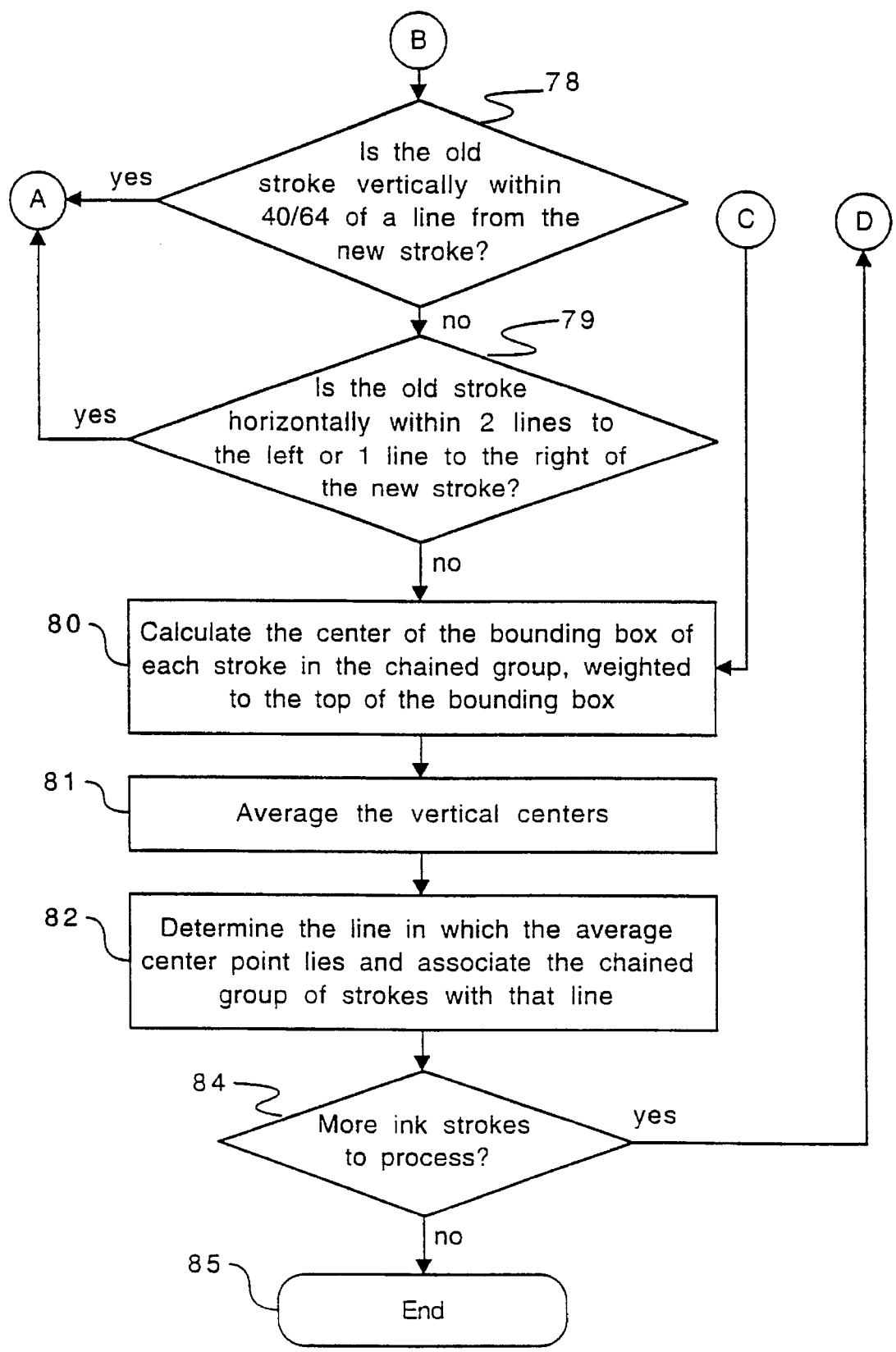

Referring now to FIGS. 4A and 4B, the preferred method for parsing the ink strokes in the writing layer to determine which line the strokes should be associated with will be described. The present invention advantageously determines one by one whether the strokes should be grouped together. Under the present invention, strokes are gathered from the instant when the pen 16 is in proximity with the display 14 until the instant when the pen 16 leaves proximity with the display 14. The individual strokes are gathered when the pen is in contact with the display. The gathered strokes are then stored in the temporary buffer and subject to the process outline in FIGS. 4A and 4B.

The preferred process begins in step 71 by retrieving the first stroke in chronological order. Next, the bounds of the stroke are determined in step 72. In step 73, the old stroke is defined to be the new stroke just retrieved, and the old stroke is added to the chained group in step 74. The present invention first divides the strokes into chained groups, and then associates all the strokes in a chained group with a line. Next, in step 75, the system test whether there are any more strokes to process. If not the chained group is complete, the strokes form a chained group, and the process jumps to step 80. However, if there are additional strokes, the process continues in step 76. In step 76, the next stroke is retrieved from the temporary buffer, and its bounds are determined in step 77. Next, the method proceeds to test whether the chain between the new stroke and the old stroke is broken. A link of the chain between strokes 172, 174 starts halfway up the right side of the bounding box 176 for the left stroke 174 and extends to half-way up the left side of the bounding box 178 for the right stroke 172 as shown in FIG. 13. The chain is deemed to be broken if it the chain extends too far above, below, to the left or to the right. In an exemplary embodiment, the chain between strokes is broken if the chain extends up more than ⁴⁰⁄₆₄th of a line height, down more than ⁴⁰⁄₆₄th of a line height, to the left more than two line heights, or to the right more than one line height. Those skilled in the art will recognize that other values may be used in each direction. For example, the values may be varied depending on the size of the writing or whether the strokes are in cursive or print. Referring back to FIG. 4B, steps 78 and 79 test whether the new stroke and the old stroke are chained together. If the new stroke and the old stroke are chained together, then the process returns to step 73 to add the new stroke the group of chained strokes and retrieve the next new stroke for processing. However, if the chain is broken, the process continues in step 80 where the vertical center for each stroke in the chained group is determined. These vertical centers are then used in step 81 to determine a average vertical center for the chained grouped. In the preferred embodiment, the strokes are weighted towards the top of the stroke to ensure that word such as "pig" or "pray" are associated with the correct line. For example, the stokes can be weighted by multiplying the top coordinate of each stroke by 2, adding the bottom coordinate and then dividing the total by three [(2·top+bottom)/3]. All the strokes in the chained group are then associated with the line in which their average weighted vertical center lies. Finally, the method tests whether there are more strokes to process. If there are, the process returns to step 71 and begins forming a new chain group. Otherwise, the line parsing process is complete and ends in step 85.

The present invention also includes several special case methods for ensuring that strokes are associated with the correct line. For example, the tap gesture to select a word, which is desirable because it is a quick gesture, and is similar to the click of a mouse. However, the same input stroke, a tap, is used to dot an "i" or add a period. Fuzzy logic is used to interpret the inputs including the time duration of the tap (Short for a tap, long for a stroke); the number of points gathered (Few for a tap, many for a stroke); and the maximum of the height and width of the bounding box of the tap (Short for a tap, long for a stroke). The fuzzy rules determine whether to call the motion a tap gesture or ink. The method also considers if the tap type stroke is made above any ink on the line, then it is biased to be ink rather than a tap. If the tap type stroke has stroke ink above and below it, or does not have stroke ink ether above or below it, then tap is biased toward being a gesture rather than a stroke. Another special method is used to associate a lines with comma or period. In particular, the single strokes of commas and periods are often made below the line intended. If the punctuation is made within a fixed tolerance of the bottom right corner of a word, the method lifts the punctuation up into the correct line. Such strokes are also biased toward being ink rather than a tap gesture.

Once the strokes have been associated with a line, they are passed to the word parsing method. The preferred method of the present invention defines stacked horizontal bands for each stroke or group of strokes for use in this band bumping method. The bands indicate the leftmost and the rightmost extent of a stroke at the vertical position of the band. The bands are preferably stacked vertically with eight bands per line. The present invention advantageously calculates bands for the current line and also the preceding line and the following line. These bands allow the present method to identify words, despite the slanting of line strokes common in many writing styles. In an exemplary embodiment, eight bands are calculated per line for three lines for a total of 24 bands. Furthermore, as strokes are grouped into characters and words, bands for the union of the strokes, characters or words are calculated. This banding information is used to calculate "delta" and "overlap." Delta is preferably the distance the between bounding boxes of the previous word and the bounding boxes of the current word. Overlap is the average distance between the three bands of the previous word and the three band of the current word that are closest together. If less than three bands have strokes entering them, then for each strokeless band, a default distance of half a line height is used in the calculation of the overlap.

Figure 5A:
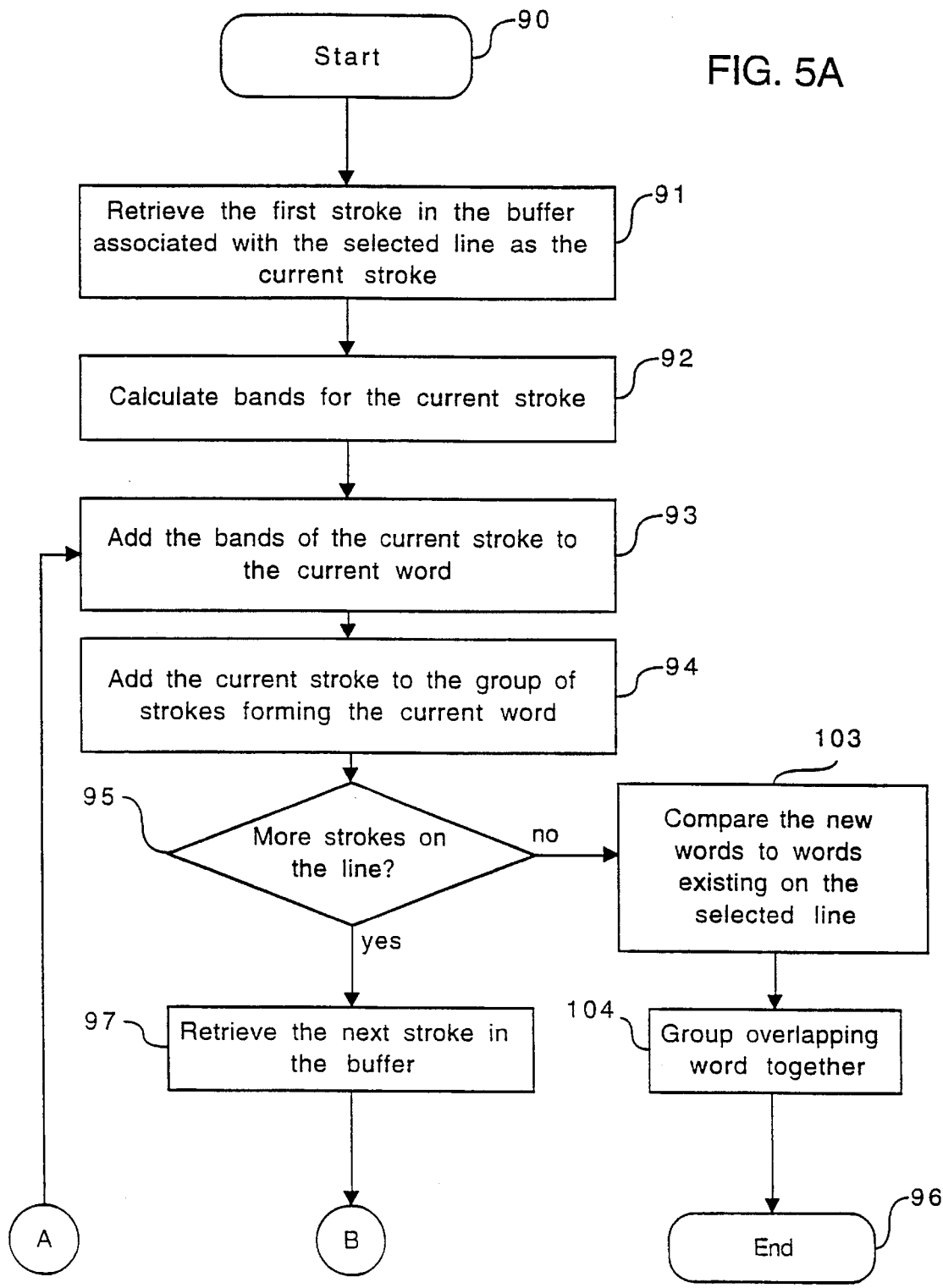
FIGS. 5A, 5B, and 5C are flowcharts of the alternate method for processing lines of stroke inputs into words according to the present invention.
Figure 5B:
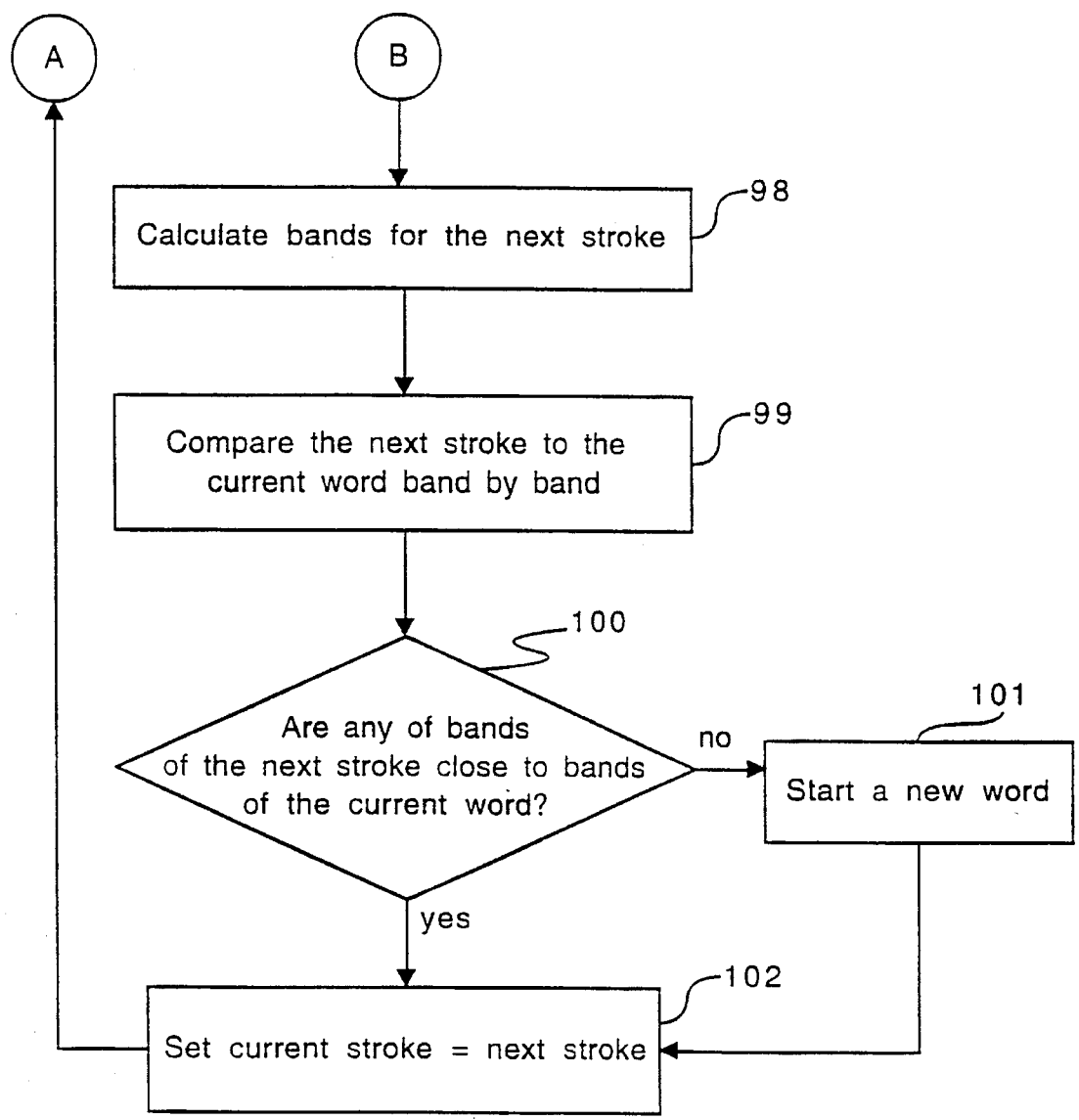
Figure 5C:
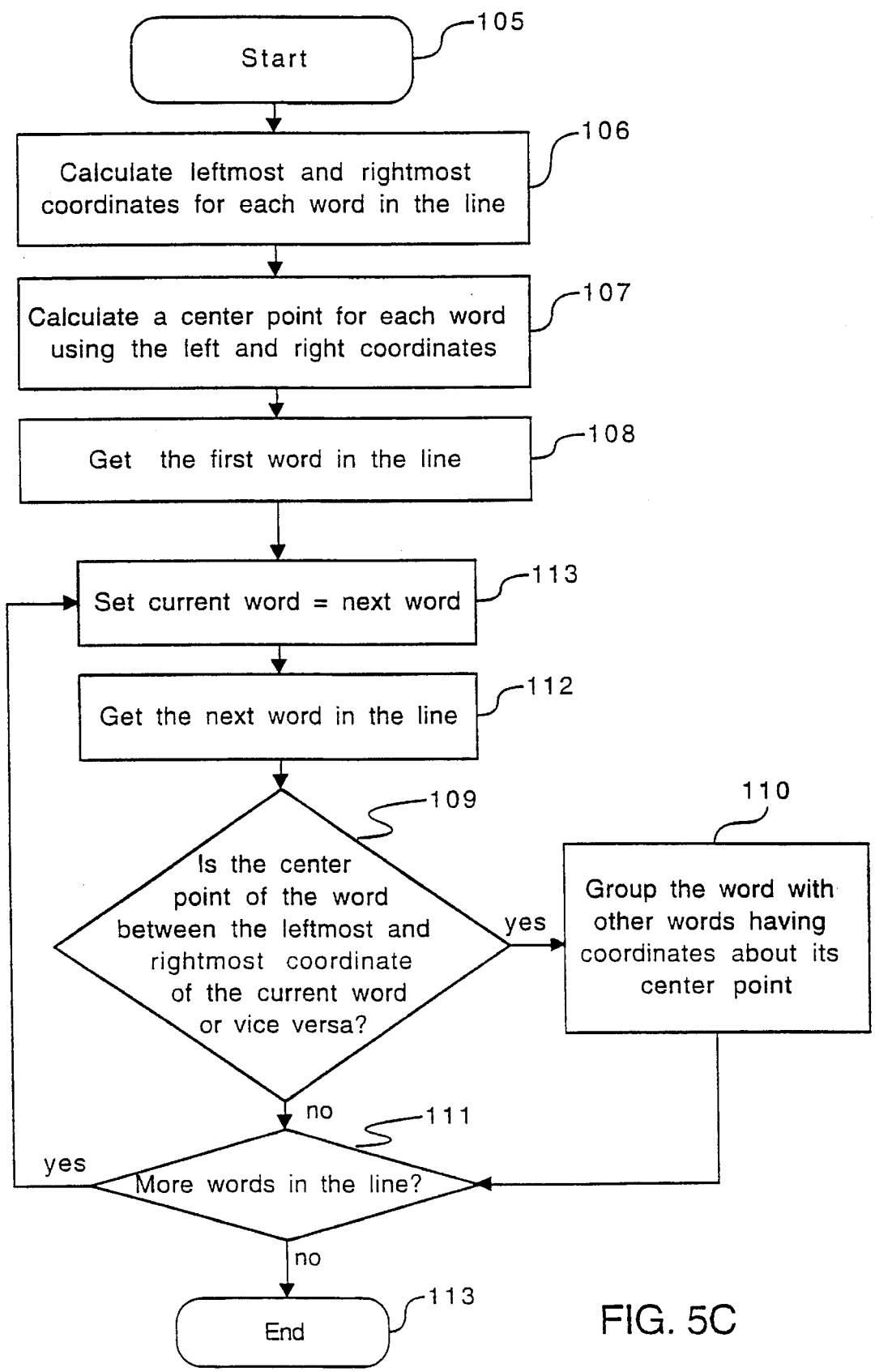
Figure 5D:
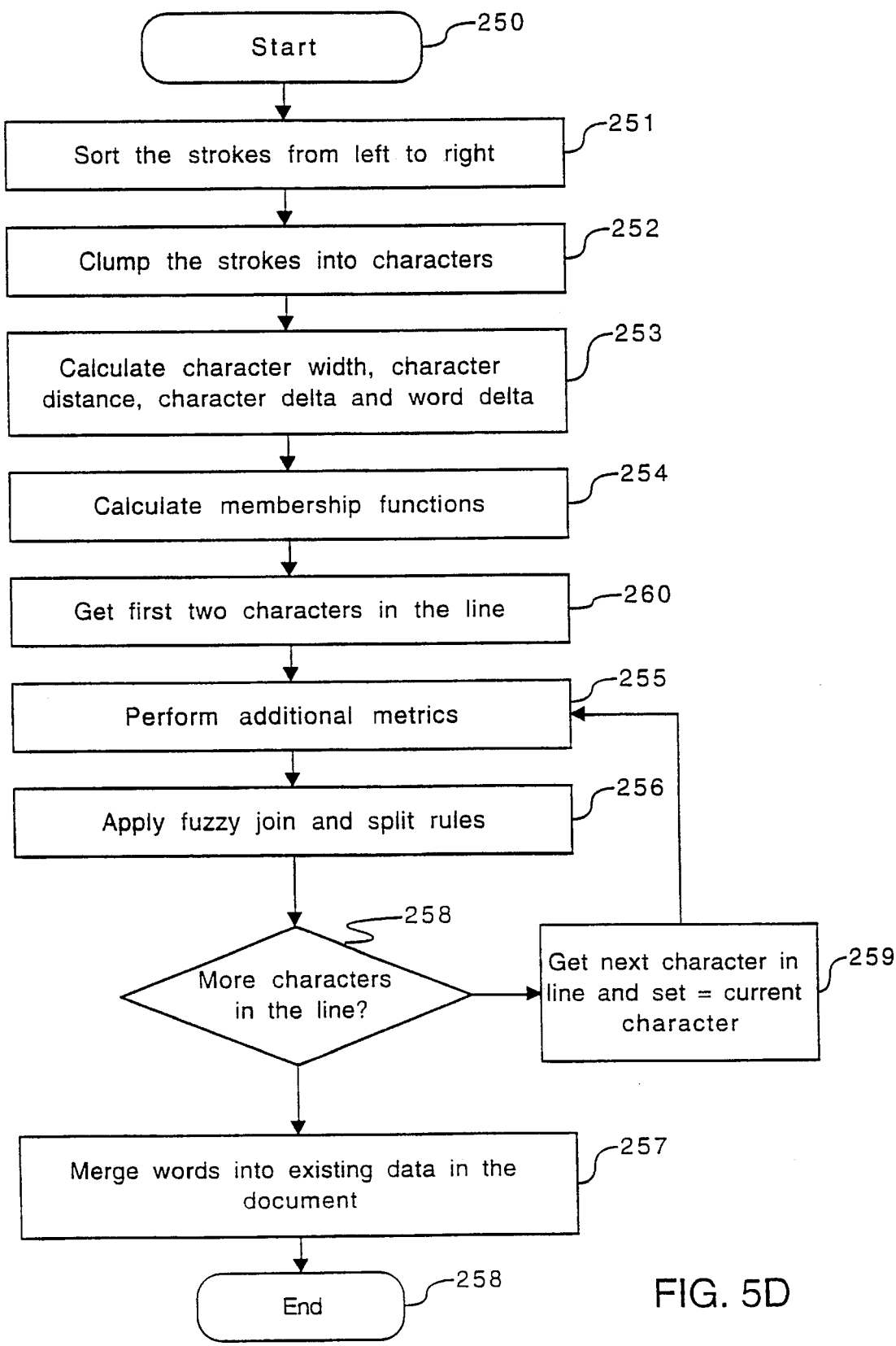
FIG. 5D is a flowchart of the preferred method for processing lines of stroke inputs into words according to the present invention.

As illustrated in FIG. 5D, the preferred embodiment of the word parsing method begins in step 251 by sorting the strokes associated with a line in left-to-right order based on the left most point in the stroke. This helps ensure that the strokes are properly clumped in the subsequent processing. Next in step 252, the strokes are clumped into characters. A center point overlap method is preferably used to group strokes together that are likely to form characters. The center point overlap method groups two strokes together based on whether the strokes or their center points overlap each other. For every stroke in a character, we calculate the leftmost and rightmost coordinates of the stroke and average them to a get a center point for the stroke. Then if the center point of a first stroke is within the leftmost or rightmost coordinates of a second stroke or second group of strokes, the first and second strokes are grouped together. The preferred method also tests whether the center point of the second stroke is within the leftmost or rightmost coordinates of the first stroke, and if so groups the strokes. This is particularly advantageous for ensuring that the dot for the character "i" or the crossing of the character "t" or "F" are properly grouped with the remaining strokes that make up the character. For example, a current stroke is clumped (grouped) with a prior stroke when the current stroke's center point is within the width of a prior stroke (plus ³⁄₆₄ths of a line height added as a tolerance), or when the prior stroke's center point overlaps the width of the current stroke (plus the ³⁄₆₄ths of a line height tolerance).

Once the strokes have been divided into characters, the preferred method calculates several global parameters about the characters in step 253. The preferred method processes each of the characters to determine the following: CharWidth, CharDist, CharDelta and WordDelta. The CharWidth is the average calculated width of a character; the CharDist is the average calculated distance between adjacent character center points; the CharDelta is the average calculated space between characters; and the WordDelta is the average calculated space between words.

These calculations are preferably computed using fuzzy logic. Fuzzy membership functions are practically expressed using a trapezoidal function of four points. The first point (point 1) indicates where the membership is false, the second point (point 2) indicates where it transitions to completely true, the third point (point 3) indicates where it ends being completely true, and the fourth point (point 4) indicates where it transitions to false. A trapezoid can describe typical situations given the placement of the points. If the first and second points are effectively negative infinity, then a value below the third point is always true. If the third and fourth points are effectively positive infinity, then any value above the second point is always true. If all of the points are all the same, then there is a single value which is true. And lastly, if the second and third point are the same, then the membership function has the shape of a triangle. For example, CharWidth is intended to indicate the width of the printed characters. The calculation of CharWidth is influenced by a fuzzy membership function that limits the influence of cursive writing and punctuation because cursive writing or short punctuation strokes should not skew the data. An exemplary membership function used for CharWidth is:

| CharWidth | Membership |
| --- | --- |
| Point 1 | 5 |
| Point 2 | 10 |
| Point 3 | 30 |
| Point 4 | 60 |

Figure 5E:
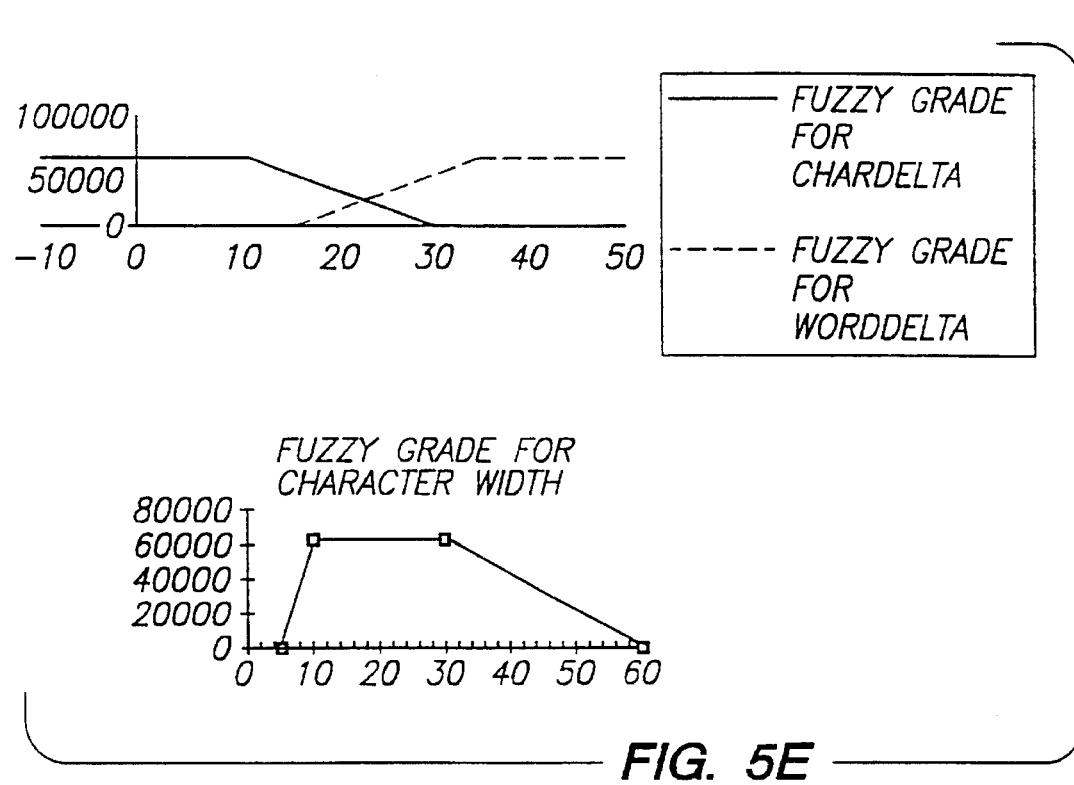
FIG. 5E is a graph of an exemplary membership function grade for character width.

In fuzzy logic, the "grade" represents the degree to which a value is a member of a set. In the preferred embodiment, the grade of TRUE is represented as 65536, FALSE as 0, and any value in between is interpolated. This is represented by the graph shown in FIG. 5E. The CharWidth is preferably calculated as an average of all of the character widths weighted by their grade in what is called a center of gravity calculation. For example, the center of gravity calculation for the four character widths of 10, 30, 45, and 60 would be:

$$\frac{10*(65535) + 30*(65535) + 45*(32767) + 60*(0)}{65535 + 65535 + 32767 + 0} = 25$$

Thus, wide cursive words and narrow punctuation do not influence the character width calculation. Any cursive word with a width greater than 60 has no influence on the character width calculation. Similarly, a comma or any other punctuation mark with a width of less than 5 has no influence on character width calculation.

Similarly, CharDelta and WordDelta are calculated using center of gravity averages and fuzzy logic membership functions. The resulting values provide good estimate of the typical character and word distances for the user's handwriting and printing are, and this influences the word parsing passes and the points at which word are separated and joined. Exemplary membership functions used for CharDelta, WordDelta and CharDist are:

| CharWidth | Membership |
| --- | --- |
| Point 1 | −32767 |
| Point 2 | −32767 |
| Point 3 | 10 |
| Point 4 | 30 |

| WordDelta | Membership |
| --- | --- |
| Point 1 | 15 |
| Point 2 | 35 |
| Point 3 | 32767 |
| Point 4 | 32767 |

| CharDist | Membership |
| --- | --- |
| Point 1 | −32767 |
| Point 2 | −32767 |
| Point 3 | 40 |
| Point 4 | 110 |

Another parameter that can be collected in this step is the waviness of the stroke. During our banding calculation, we would also note how many times the angle of the stroke polyline changed from heading up to heading down, or vice-versa. High waviness would be an indication of cursive writing, and this would be an additional input into our fuzzy rules.

Once the values for CharWidth, CharDist, CharDelta and WordDelta have been calculated, the preferred method proceeds to step 254. In step 254, additional membership functions are calculated using the values resulting from step 253. The Narrow Width, Character Width, and Not Character Width membership functions associated with character width are calculated. The Narrow Width membership function is important for discriminating very narrow characters such as "l" or "1". The Character Width, and Not Character Width membership functions are for determining when a character is a typical character and something that is too wide to be a character (probably cursive), respectively. Character Distance and Not Character Width are membership functions associated with character distance, and are next calculated. The next two membership functions, Character Delta and Word Delta, indicate whether characters form a word, and are calculated. Next, two membership functions, Overlapping and Not Overlapping are calculated for determining whether the characters are overlapping. Finally, an output membership table, Entry Merge, describes whether an current entry should be clumped with the previous entries in the list of clumped characters. Exemplary values for each of these membership functions are provided in Appendix A.

Once all the membership functions have been established for this line of characters, the method, beginning with the two leftmost characters and proceeding to the right, determines whether the characters should be grouped together. In step 255, four values are first calculated: an ENTRY_DELTA, an ENTRY_OVERLAP, ENTRY_WIDTH and a PREV_ENTRY_WIDTH. The ENTRY_DELTA is the delta between this clump and the previous clump. The ENTRY_OVERLAP is the overlap between this clump and the previous clump. The ENTRY_WIDTH is the character width of the clump. The PREV_ENTRY_WIDTH is the character width of the previous clump. Once these values are known, they are used in step 256 by a plurality of rules to determine if the characters should be combined. Each rule provides a contribution to a value X that will ultimately determine if the characters should be joined. For example, one rule provides that if the ENTRY_DELTA is true in the WORD_DELTA membership function then the DEFINITELY_SPLIT value of the ENTRY_MERGE table should be added to X. A second rule provides that if the ENTRY_OVERLAP is true in the OVERLAPPING membership function then the DEFINITELY_JOIN value of the ENTRY_MERGE table should be added to X. Examples of a plurality of these rules is provided in Appendix B. Once all the rules have been evaluated, the current and previous characters will be joined if X is zero or greater, otherwise the characters will be split. The process of calculating the four values and the evaluating the rules is then repeated using the current character as the previous character and retrieving the next character in the line as the current character in step 259.

Finally in step 257, the words from the previous steps are merged with the existing data in the document. The center point algorithm and band bumping are preferably used in this step to determine whether the words should be joined with existing words. For every word that is output by the previous step, if any of the word's bands come within a tolerance of the corresponding bands of any of the words on the line, then the words are joined. If words are not joined by this band bumping, then if center points overlap then words are joined. Otherwise the word is placed into the existing data as is.

An alternate method for word parsing is detailed with reference to FIGS. 5A, 5B, and 5C. The process begins with a fresh line or fresh page. First, an initial stroke on the selected line is chosen as the current stroke in step 91. In step 92, the bands in the preceding, current and following lines (i.e., a 24 maximum) are calculated for the stroke. Then in step 93, the bands for the current stroke are added to the bands for the current word. Since this is the first stroke, it is the only stroke comprising the current word. In step 95, the method determines whether there are additional strokes in the selected line to process. If there are none, the process continues in step 103 as will be discussed below with the single stroke forming the only word on the line. The system is able to process strokes later input by adding the strokes to a word or new strokes may be added to form new words on the line. The system will utilize the current information about the strokes, and use the information about existing strokes on the line. However, if there are additional strokes on the line the process continues in step 97 where the next stroke to the right of the current word is retrieved. Then in step 98, the bands for the next stroke are calculated. Next, in step 99, the bands of the next stroke are compared with corresponding bands of the same vertical height for the current word. In step 100, the alternate method determines whether any of the bands of the current word are "close" to bands in the next stroke. Bands are "close" if the left edge of any of the bands for the next stroke come within a tolerance distance of the right edge of any of the bands in the current word. In an exemplary embodiment, the tolerance distance is variable with the default set to be ⅕ of a line height. If the current word and the next stroke are close, then the next stroke is clumped with the other strokes in the current word. The current stroke is set equal the next stroke in step 102, and the process returns to step 93 to add the current stroke (formerly the next stroke) to the current word. Additional strokes in the line are then processed until there are no more strokes to process. However, if the current word and the next stroke are not close, then the method proceeds to step 101 and a new word is started, the process continues through steps 102 and 93 to add the current stroke (formerly the next stroke) to the current word. Additional strokes can then be processed until all the strokes in the line have been parsed.

Once the process of grouping the newly entered strokes into new words is complete, the process will exit the first parsing level and proceed from step 95 to step 103, as briefly noted above, to a second level of word parsing. In the second word parsing level, the new formed words are compared to the existing words, if any, that are already present on the selected line in step 103. The bands of the new words are compared to the bands of the existing words in the same manner as has been described above. If any of the new words overlap or come within a predetermined tolerance of the bounds of existing words, the new word and existing word are combined in step 104. This comparison is preferably done by comparing each of the new words to each of the existing words and combining them as necessary. The word parsing process then ends in step 96.

As illustrated in FIG. 5C, the word parsing method of the present invention also includes additional clumping of words, on both parsing levels, for properly grouping special cases such as the dot over the "i" and "j", or the stroke across the "T", "F" or "E" whose bands may not overlap. The alternate method begins in step 106 by calculating the leftmost and rightmost coordinates for each word in the line. The center point for each word is then calculated in step 107. The center point is determined by calculating the leftmost and rightmost coordinates for each stroke in the word, and then averaging the coordinates to get a center point for the word. In step 108, the first word in the line is retrieved. Next, in step 113, the current word is set to be the next word or the word most recently retrieved. Then in step 112, the next word in the line is retrieved and set as the next word. In step 109, the center point of the next word is compared to the leftmost and rightmost coordinates for the current word, and the center point of the current word is compared to the leftmost and rightmost coordinates for the next word. If either the center point of the current or next word is between the coordinates of the other word, then the words are grouped with that word in step 110 before proceeding to step 111. If both center points are not between the coordinates of the other word (plus a tolerance), then the process proceed directly to step 111. The process then determines if there are more words to be tested in step 111. If there are not the process is complete. Otherwise, each word is successively retrieved and has its center point compared to the leftmost and rightmost coordinates for the other words in the line. This is accomplished by returning the method to step 113.

Once the strokes have been grouped into words, the present invention advantageously provides new gestures for joining words that should have been grouped and were not, or for splitting strokes that form a single word and should have been two words. The present invention provides a down-right gesture for splitting a single word into two words. The point at which the word is divided and the strokes associated with the left and right word portions is determined by the hot point of the gesture. The hot point of the gesture is the starting point from which the stroke forming the gesture begins. The present invention preferably divides the strokes such that any stroke with a center point to the left of the hot point forms part of the left word portion, and any stroke with a center point to the right of the hot point forms part of the right word portion. The down-right gesture of the present invention is also advantageous because it can be used to specify the amount of white space to insert between split word. The first down-right gesture will split the strokes forming a single word, and insert a predetermined amount of white space, for example, ⅓ of a line height. A subsequent down-right gesture opens up a white space with a width about equal to ½ of the width of the down-right gesture. Similarly for joining words, when a space is selected and deleted, it is first deleted to a nominal predetermined space such as ⅓ a line height. Then if the nominal space is selected and deleted, the words about the space are joined into a single word.

Figure 6A:
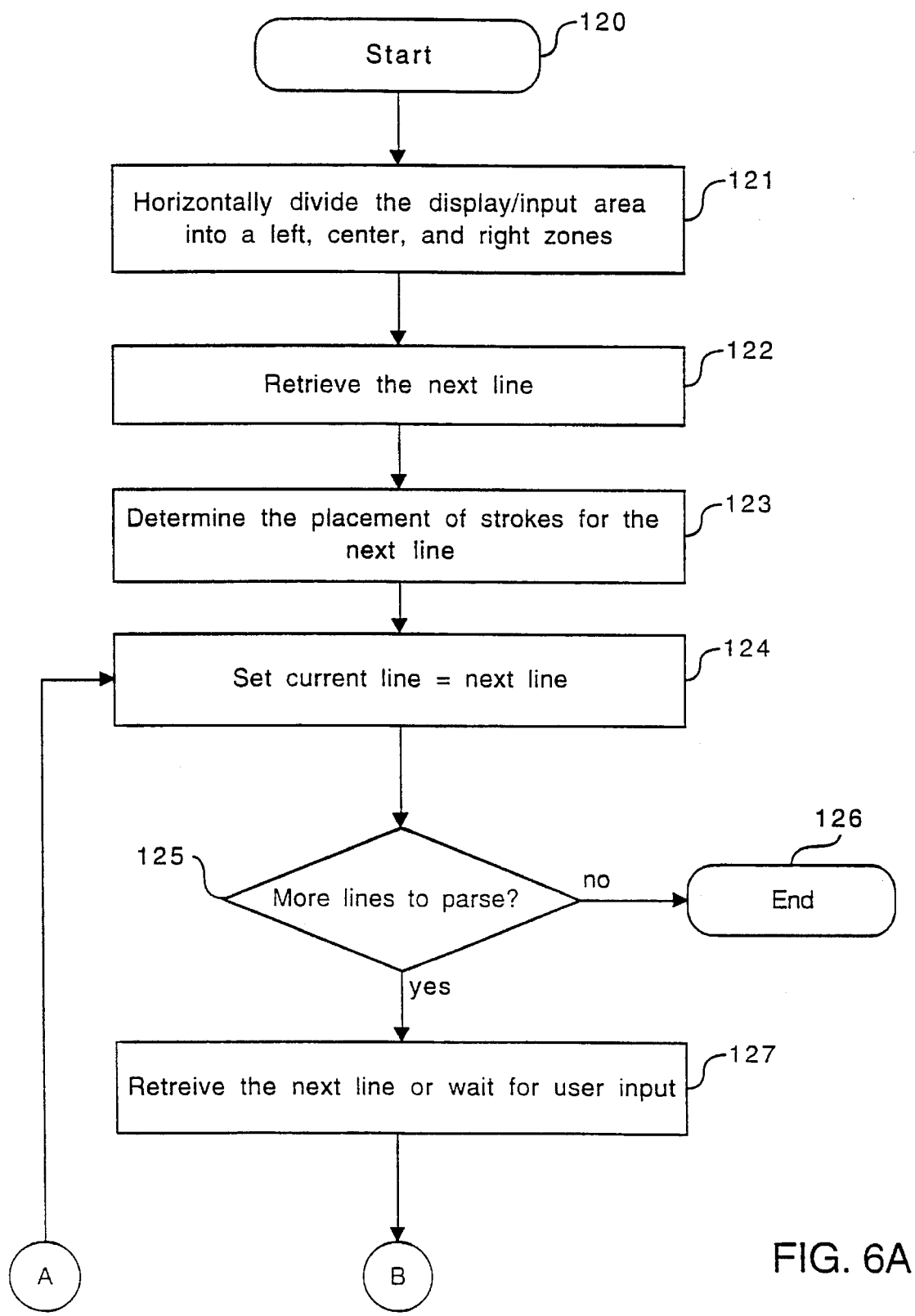
FIGS. 6A and 6B are a flowchart of the preferred method for dividing words into paragraphs according to the present invention.
Figure 6B:
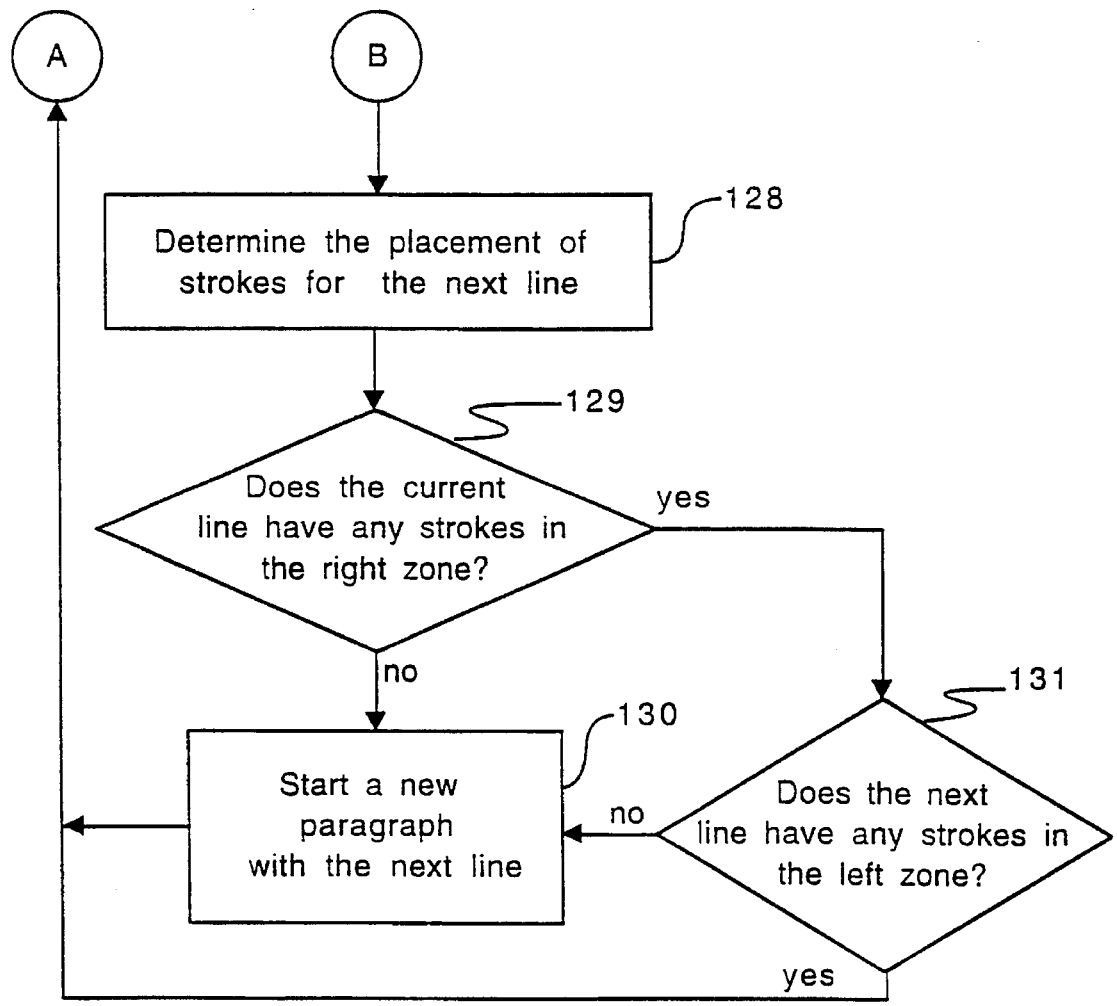

One embodiment for the final level of processing in the writing layer, paragraph parsing, is illustrated in FIGS. 6A and 6B. Once the strokes have been parsed into lines and words, they are divided into paragraphs. The division into paragraphs in pen-based computing is very different from keyboard-based systems where the paragraphs are specifically noted by carriage returns. The division of words into paragraphs also allows for a word wrapping feature common in most keyboard-based systems. The process for paragraph parsing begins in step 121 where the display is divided into three vertical zones by two vertical lines. In this embodiment of the present invention, the boundaries for the left, center, and right zones are made adjustable. The user interface may provide symbols, such as triangles, proximate the top of the page. It may also include an option sheet where the dimensions can be numerically set. The symbols represent two imaginary lines that divide the display into the three regions. The dimensions of the zones can be adjusted by tapping on the symbols and dragging them to the desired position. The zones include a left zone, a center zone, and a right zone. The present invention advantageously groups lines together when the current line has strokes in the right zone and the next line has strokes in the left zone. The method parses the lines by retrieving the strokes for the next line in step 122. In step 123, the placement of the strokes for the next line is determined and the current line is set equal the next line in step 124. Then in step 125, the system tests if there are more lines on the page to parse. If not the process in complete. If there are more lines to parse, the system retrieves the next line in step 127, or wait for further input from the user in strokes are being entered. The placement of strokes for the next line (the new line just retrieved) is determined in step 128. In step 129, the method test whether the previous line has any strokes in the right zone. If not, the current line is the last line in a paragraph, and a new paragraph is started with the next line in step 130. If the previous line has strokes in the right zone, the it may not be the end of the paragraph, and the method proceeds to step 131. Step 131 tests whether the next line has strokes in the left zone. If there are strokes in the left zone, the previous line and next line are in the same paragraph, and the method returns to step 124 to process any additional lines. If there are no strokes in the left zone, a paragraph is inserted after the previous line in step 130. Then the method returns to step 124 to process any additional lines.

The preferred embodiment for paragraph parsing methods of the present invention can best be understood with reference to the description below and FIGS. 16A, 16B and 16C. The methods of the present invention are distinct from existing paragraph parsing methods because the existing methods rely exclusively on the positioning of the text line within the view. The methods of the present invention not only involve the position of the text line, but also the context of the text line in relationship to other text lines. Therefore, more sophisticated styles of paragraphs and lists are accommodated.

As shown in FIG. 16A, the present invention preferably divides the display area into four vertical zones. The parse rules described of the preferred method use four invisible columns within the text view to describe the left and right edges of a text line. The columns are named left to right with the letters A, B, C and D. An exemplary embodiment for the positions of the columns are:

| Column | Position |
|--------|----------|
| A | left edge of view to ⅓ view width; |
| B | ⅓ view width to ½ view width; |
| C | ½ view width to ⅔ view width; and |
| D | ⅔ view width to right edge of view. |

Those skilled in the art will realize that the boundaries of the columns can be modified to the particular writing style of the user and these dimension are provided only by way of example.

When the position of the left and right edges of the text line are calculated in the preferred embodiment, the coordinate values that describe the position are preferably rounded to values that have a higher granularity than raw horizontal coordinate values. For example, horizontal coordinate values are represented with respect to the height of a line with each coordinate being ¹⁄₆₄th of the height of a line. The edge positions of text lines are rounded to 1.5 line heights or to values which are multiples of 96 horizontal coordinates. The present invention provides such rounding of edge positions of text lines to make it easier to align the left edge of text lines using gestures which have very coarse resolution compared to horizontal coordinate values. The rounding also hides the drifting of lines of text in the horizontal direction as the lines of text are being written by hand.

The preferred embodiment provides three methods that are successively applied when parsing words into paragraphs. The first method provides for standard paragraph parsing, the second method provides for paragraphs preceded by bullet characters, and the third method provides for list paragraph parsing. The second method is applied if a predetermined bullet character begins the line. Then, the first method is applied for standard paragraph parsing. If neither of the two previous method are effective in dividing the lines into paragraphs, they are considered a list and processed according to the third method.

Referring now to FIG. 16A, the method for standard paragraph parsing is described. The method parses standard paragraphs using the following rules. These rules are used to determine if text lines should be grouped together to form standard paragraphs written in block form or with the first line indented or outdented.

1. For a text line to qualify as the first line of a paragraph it must start in column A of the view.
2. For the next line following an identified first line to continue the paragraph, (1) the left edge of the next line must be in column A of the view, and (2) the right edge of the identified first line must be in column D of the view.
3. For the third and succeeding lines to continue the paragraph, (1) the right edge of the previous text line must be column D and (2) the left edge of the current text line must be within one line height to the left or right of the left edge of the previous line.
4. The left edge position of the first line (rounded to the nearest snap position) specifies the left indent of the first line only.
5. The left edge position of the second line (rounded to the nearest snap position) specifies the left indent for all lines other than the first line.

The method of the present invention applies the above rules as appropriate, and parses each line of text in a document from beginning to end to identify the locations where the paragraph breaks should be. For example, the present invention would parse through blank lines until a line with text is encountered. The above rules would then be used to determine if the line begins a paragraph. If it does, the lines of text, if any, following the first line would be either associated with the first line as a paragraph or the process would look for a new first line in the remain lines of text. The above rules are reapplied to the lines on the display in cases were the paragraphs are modified, or in cases where the pen moves in and out of proximity.

Referring now to FIG. 16B, the method for parsing paragraphs to identify bullet paragraphs will be described. The present invention advantageously recognizes as separate paragraphs that begin with predetermined bullet characters. A bullet paragraph is similar to a regular paragraph, except that the first text element within the paragraph is a valid bullet character. Valid bullet characters are hyphens in the example, but a variety of other characters could be used. The following rules are used to determine if text lines should form bullet paragraphs.

1. For a text line to qualify as the first line of a bullet paragraph it must (1) begin with a valid bullet character in column A or B of the view.
2. For a second text line to continue the bullet paragraph from the first line it must (1) start within column A or B of the view, and (2) the right edge of the first line must be in column D of the view.

3. For third and successive lines to continue the bullet paragraph each line must have (1) the right edge of the previous text line in column D of the view and (2) the left edge of the text line must be within one line height to the left or right of the left edge of the previous text line.

4. The left edge position of the bullet character (rounded to the nearest snap position) specifies the left indent of the first line only.

5. The left edge position of the second line (rounded to the nearest snap position) specifies the left indent for all lines other than the first line.

6. The word after the bullet character in the first line is preferably forced to the left edge position of the second line.

Figure 16C:
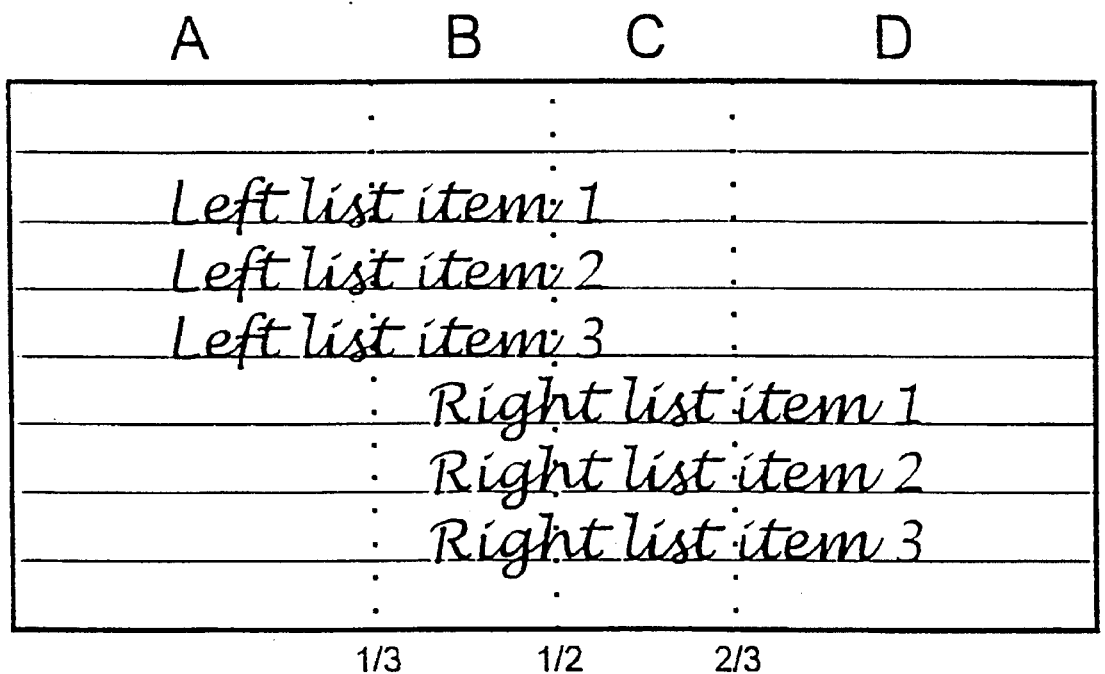

Referring now to FIG. 16C, the list paragraph parsing can be seen. These rules can be used to determine if text lines should form list paragraphs. The paragraph parsing method of the present invention does not check to determine if text should form a list, but rather all lines which are determined not to form standard paragraphs or bullet paragraphs are treated as list items. Therefore, the following rules describe the characteristics of text lines in a list.

1. A list line which begins in column A of the view must not end in column B or C of the view. If it does, it may be mistaken for the first line of a paragraph.

2. All text lines which begin in column B, C or D are considered to be list lines.

3. The left edge position of the first text line (rounded to the nearest snap position) of the list element specifies the first line indent and the left indent for all subsequent lines if the list line must be wrapped.

Turning now to FIGS. 7–12, the processing by the drawing layer will be described in detail. One of the primary advantages of the present invention is ability of the system to simultaneously accept an manipulate text and drawing figures in the same interface as has been described above. However, the processing in the drawing layer also has other advantageous features. The present invention advantageously broadens the definition of line type elements, thereby, expanding the number of operations-that can be performed on many figures. As shown in FIG. 9A and 9B, most computer drawing programs provide two types of elements that can be manipulated. FIG. 9A shows a shape type element 180 that provides a bounding box defined by handles 182, 184 about the periphery of the bounding box for modifying and manipulating the shape type element 180. Shape type elements 180 typically have at least four handles to define the bounding box. FIG. 9B show a line type element 186 that provides two handles 184 at opposite ends of the stroke. The present invention is advantageous because it does not limit line type elements 184 to pure geometric lines and segments as does the prior art. As illustrated in FIG. 9B, the figure has line type characteristics despite the fact that it is not a line in the true geometric sense.

Figure 7A:
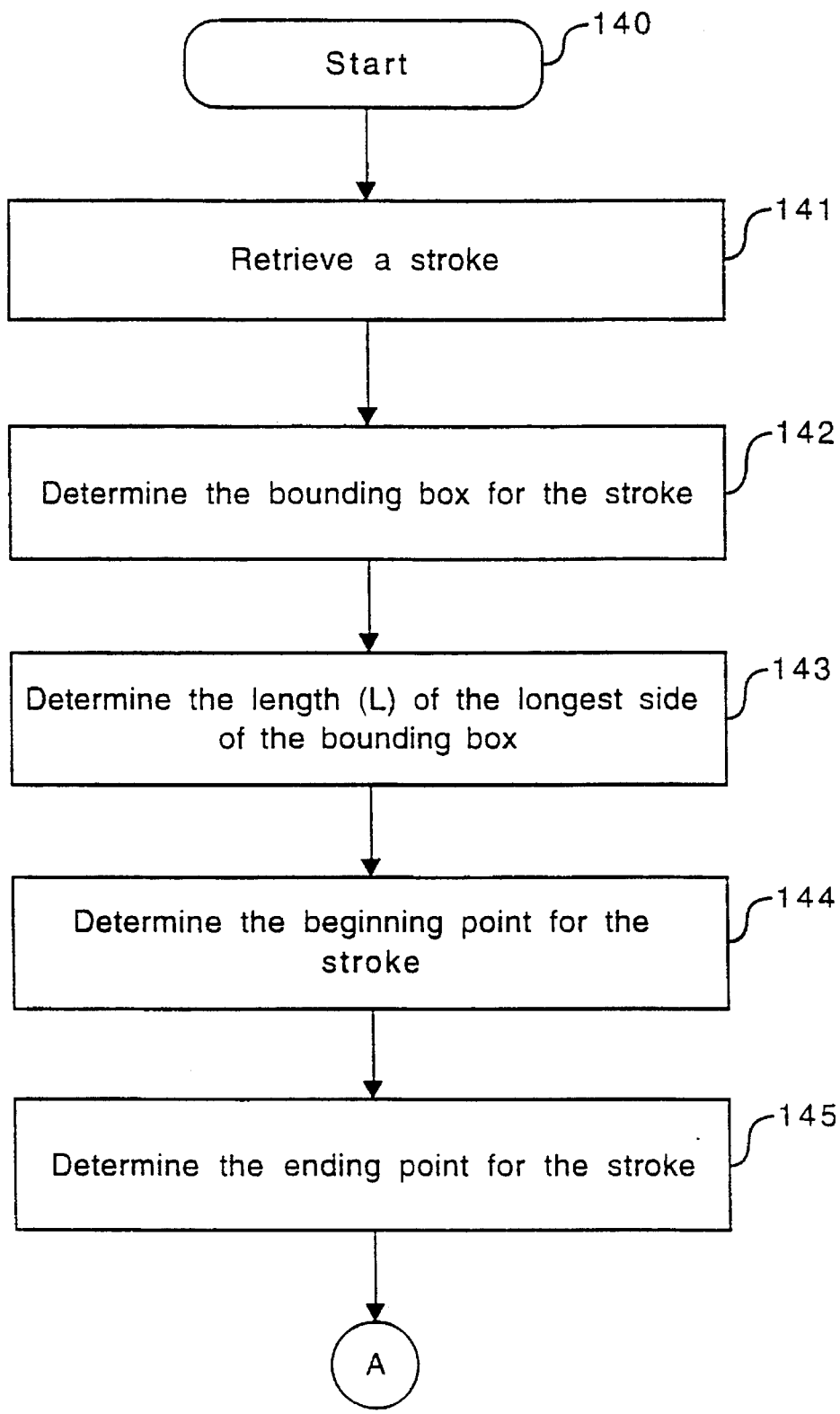
FIGS. 7A and 7B are a flowchart of the preferred method for determining whether a stroke is a line type or shape type drawing according to the present invention.
Figure 7B:
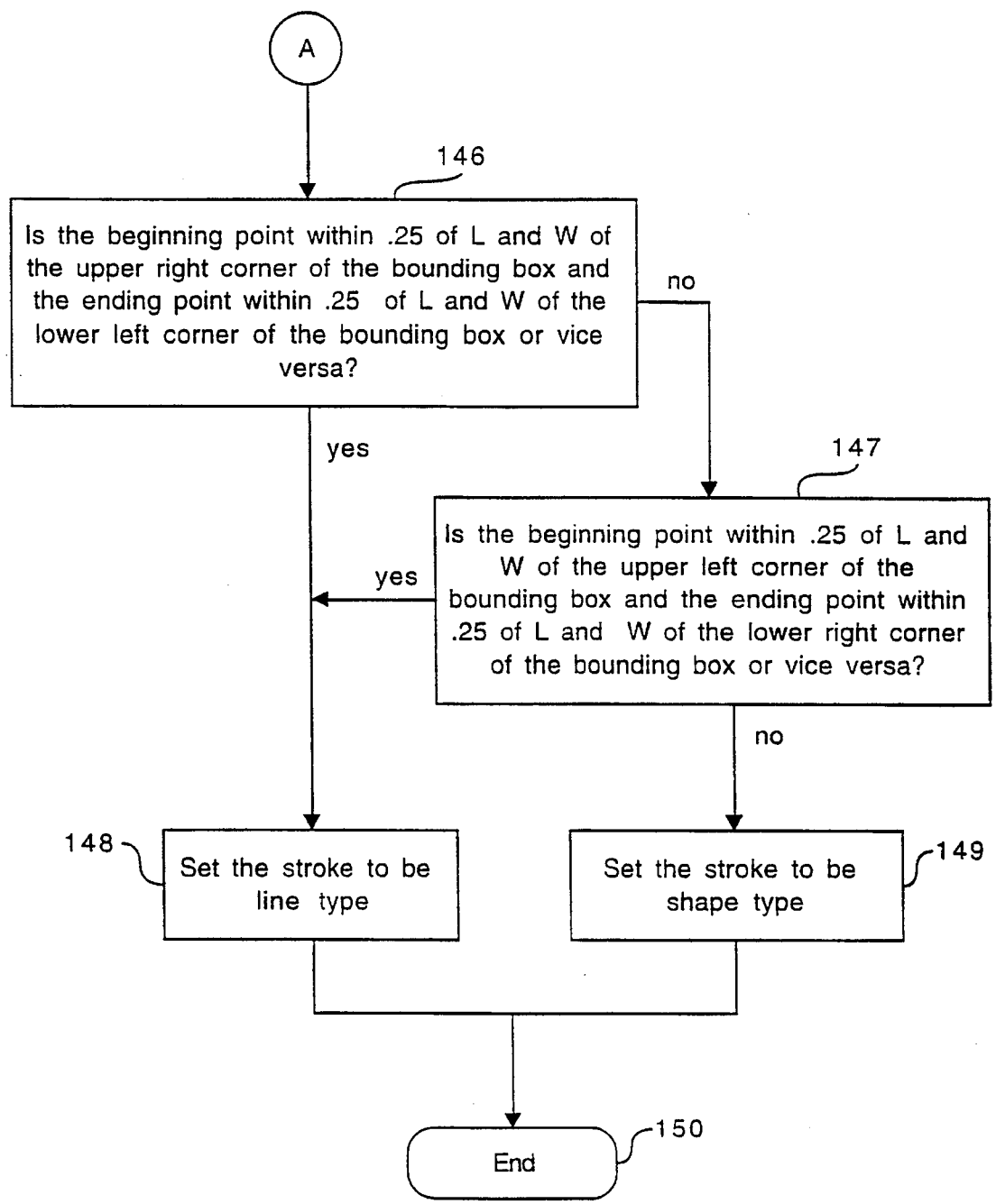
Figure 8A:
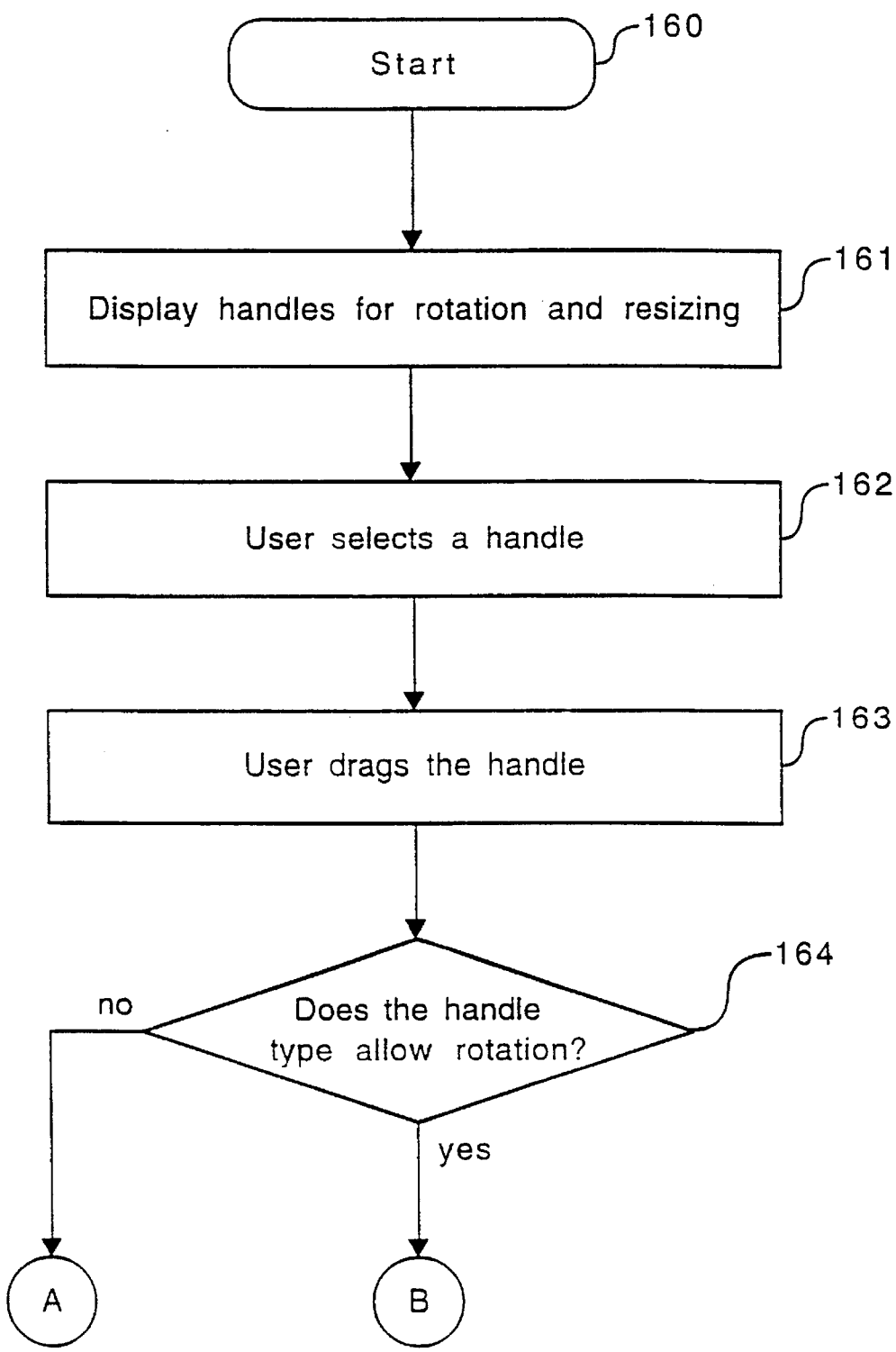
FIGS. 8A and 8B are a flowchart of the preferred method for performing rotation and re-sizing operations in accordance with the present invention.
Figure 8B:
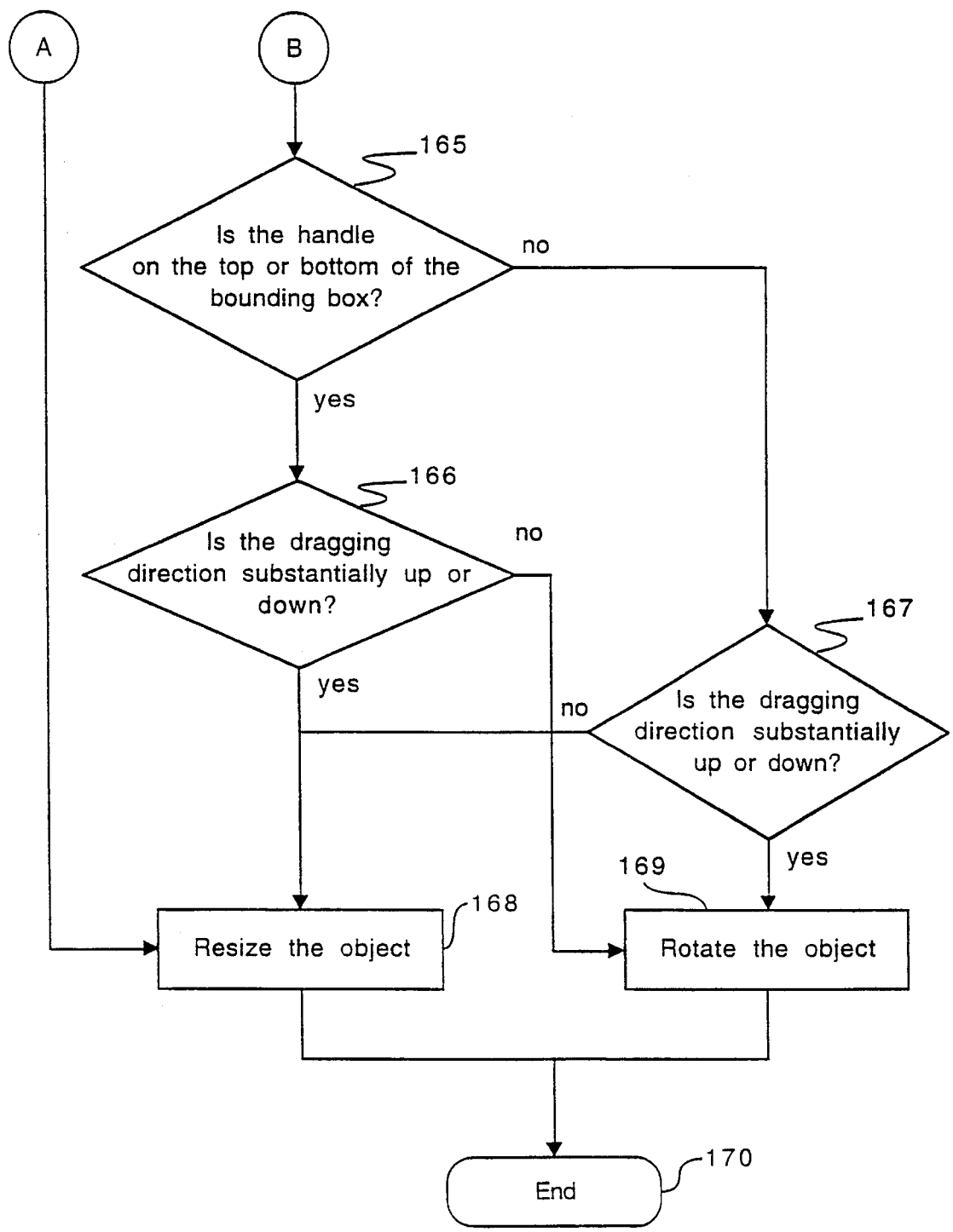

In addition to the broadened definition for line type elements 186, the present invention includes a method for automatically categorizing ink stroke inputs as line type or shape type elements. Referring now to FIGS. 7A and 7B, the preferred method for identifying the element type in the drawing layer is illustrated. The process begins by retrieving the stroke to be typed or categorized in step 141. The bounding box for the stroke is determined in step 142. Next in step 143, the lengths, L and W, of two adjacent sides of the bounding box are determined. Then in steps 144 and 145, respectively, the beginning point and the ending point for the stroke are determined. In order to determine whether a stroke is a line type or a shape type the present method compares the beginning and ending points of the stroke with the bounding box for the stroke. If the beginning point and ending points are within a predetermined distance of the opposite corners of the bounding box the stroke is a line type element. The present invention preferably selects the predetermined distance to be a percentage of L and W for each corresponding side of the bounding box. In addition a minimum value must be met if L and W are unusually large. In an exemplary embodiment, the percentage is set to be 25% and the minimum is set to be ¼ of a line height. Thus, then end points of the stroke must be within 0.25 times L and 25 times W of opposite corners of the bounding box for the stroke to be a line type element. In step 146 of FIG. 7B, the method first tests whether either of the following is true: 1) the beginning point is within the predetermined distance from the upper right-hand corner of the bounding box for the stroke and the ending point is within the predetermined distance of the lower left-hand corner of the bounding box; or 2) the beginning point is within a predetermined distance from the lower left-hand corner of the bounding box for the stroke and the ending point is within the predetermined distance of the upper right-hand corner of the bounding box. If either test is true, then the stroke is set to be a line type in step 148, and the process ends in step 150. Otherwise, the method continues in step 147 to test whether the stroke extends between the other pair of opposite corners. Step 147 tests whether: 1) the beginning point is within the predetermined distance from the upper left-hand corner of the bounding box for the stroke and the ending point is within the predetermined distance of the lower right-hand corner of the bounding box; or 2) the beginning point is within the predetermined distance from the lower right-hand corner of the bounding box for the stroke and the ending point is within the predetermined distance of the upper left-hand corner of the bounding box. If either test in step 147 is true, the stroke is processed as a line type in step 148, otherwise the stroke is set to be a shape type in step 149. Those skilled in the art will realize that this method may also be modified to process groups of strokes as line or shape types. For example, when processing a group of strokes the bounding box is defined as a box including all the strokes contained within the group. The method then proceeds as described above to determine if any one strokes in the group meets the criteria to qualify as a line type. If there is even a single stroke that qualifies as a line type, then the entire group of strokes is given the characteristics of a line type, with box being that including all the strokes contained within the group.

The note taking system of the present invention is also advantageous because of the additional functionality in the user interface. Conventional computer drawing programs only provide a single handle type for re-sizing the object or stroke in the bounding box. In order to perform other features such as rotation of the object, the user must select the object and then activate a menu containing special tools for rotation. However, the present invention provides two types of handles 182, 184 as shown in FIG. 9A and 9B. The method of the present invention for providing both rotation and re-sizing of the objects begins in step 161 by displaying the two types of handles 182. 184. The two types of handles are displayed in a visually distinct manner so that they can be readily identified by the user. The first handle type 182 is represented on the display as a small square about the periphery of the bounding box and can be used only for re-sizing. The first handle type 182 is primarily positioned on the corners of the bounding box for shape type objects. The second handle type 184 is represented on the display as a small circle. The second handle type 184 allows the object to be rotated or re-sized. For shape type objects, the second handle type 184 either re-sizes or rotates the object depending on the location of the handle and the direction it is moved. The second handle types 184 are preferably positioned on the sides of the bounding box between first handle types 182. For line type objects, second handle type 184 simultaneously re-sizes and rotates the object. The second handle types 184 are preferably positioned at the endpoints of line type objects.

Referring back to FIGS. 8A and 8B, the preferred method for processing input on the first and second handle types 182, 184 continues in step 162. The user first selects a handle in step 162 and then manipulates it (i.e., drags the handle) in step 163. The process then determines the type of the handle and whether it allows rotation in step 164. If the handle does not allow rotation (first type handle 182), the process moves to step 168 and the object is re-sized in a conventional manner simultaneously both horizontally and vertically (two dimensions). However, if the handle does allow rotation (second type handle 184), the process moves to step 165. Generally, the method of the present invention will rotate the object if the direction the handle is dragged is substantially parallel to the closest side of the bounding box, and will re-size the object in one dimension if the direction of the handle is dragged is substantially perpendicular to the closest side of the bounding box. For example, in one embodiment a square area with each side about ⅛th of an inch from the handle 184 is defined and divided into equal triangular quadrants. If the handle is dragged into either quadrant that contains a side of the bounding box, the object is rotated. If the handle is dragged into either quadrant that does not contain a side of the bounding box, the object is re-sized. In step 165, the method determines the position of the second type handle 184. If the handle is on the top or the bottom of the bounding box process continues in step 166, otherwise the process continues in step 167. In step 166, we know second type handle 184 is on the top or bottom of the bounding box. Therefore, movement in a substantially vertically direction is interpreted as a re-sizing instruction, while movement in a substantially horizontal direction is interpreted as a rotation instruction. Depending on the orientation movement, substantially vertical or horizontal, the method proceeds to either step 168 to re-size the object, or to step 169 to rotate the object. In either step 168 or 169, the action is performed in the same direction the object was dragged. Similarly, in step 167, we know second type handle 184 is on the side of the bounding box. Therefore, opposite with step 166, movement in a substantially vertically direction is interpreted as a rotating instruction, while movement in a substantially horizontal direction is interpreted as a resizing instruction. Once the object has been rotated or re-sized, the operation is complete in step 170.

The user process for re-sizing and rotating are best shown in FIGS. 10–12. FIG. 10A show a selected line object 190 and the user is dragging a handle 192 from a first position 192A to a second position 192B. As described above, the present invention simultaneously re-sizes and rotates so that result of dragging handle 192 is shown in FIG. 10B where the line has been both re-sized and rotated. As can be seen, the rotation preferably occurs about the opposite end point for the line object 190 delineated by a solid small square 194.

FIGS. 11A–11C demonstrate user manipulation of the second type handle 184 to rotate a shape type object. The user first selects the shape object to reveal the handles as shown in FIG. 11A. The user then selects a handle 196, and drags the handle 196 in this case in substantially vertical direction from point 196A to point 196B. The present invention advantageously shows an outline 198 of the position to which the shape object will be rotated. The user can then tap on the handle 196 to rotate the object to the position shown in FIG. 11C.

FIGS. 12A–12B demonstrate user manipulation of second type handle 184 to re-size a shape type object. The user first selects the shape object to reveal the handles as shown in FIG. 11A. The user then selects the handle 196, and drags the handle 196 in this case in a substantially horizontal direction from point 196A to point 196C, as shown in FIG. 12A. The present invention advantageously displays an outline 200 of the position to which the shape object will be re-sized. The user can then drag the handle 196 to re-size the object to the size shown in FIG. 12B. FIG. 12C illustrates the manipulation of first type handle 182 to re-size a shape type object. This operates in a conventional manner to re-size the object to the size of outline 204 when the handle 202 is dragged from point 202A to 202B.

Figure 14A:
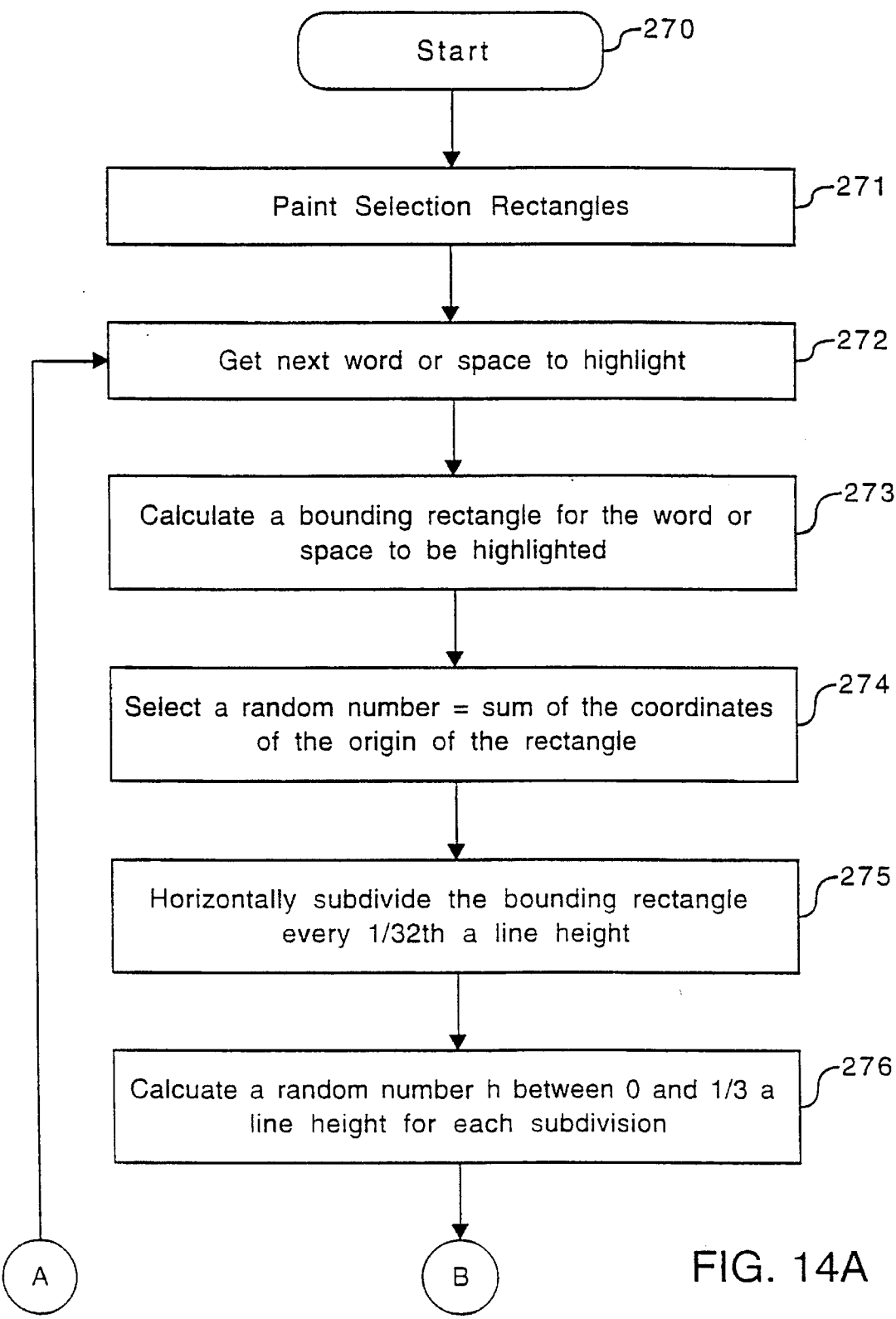
FIGS. 14A and 14B are a flowchart of the preferred method for highlighting graphical representations of strokes on the display.
Figure 14B:
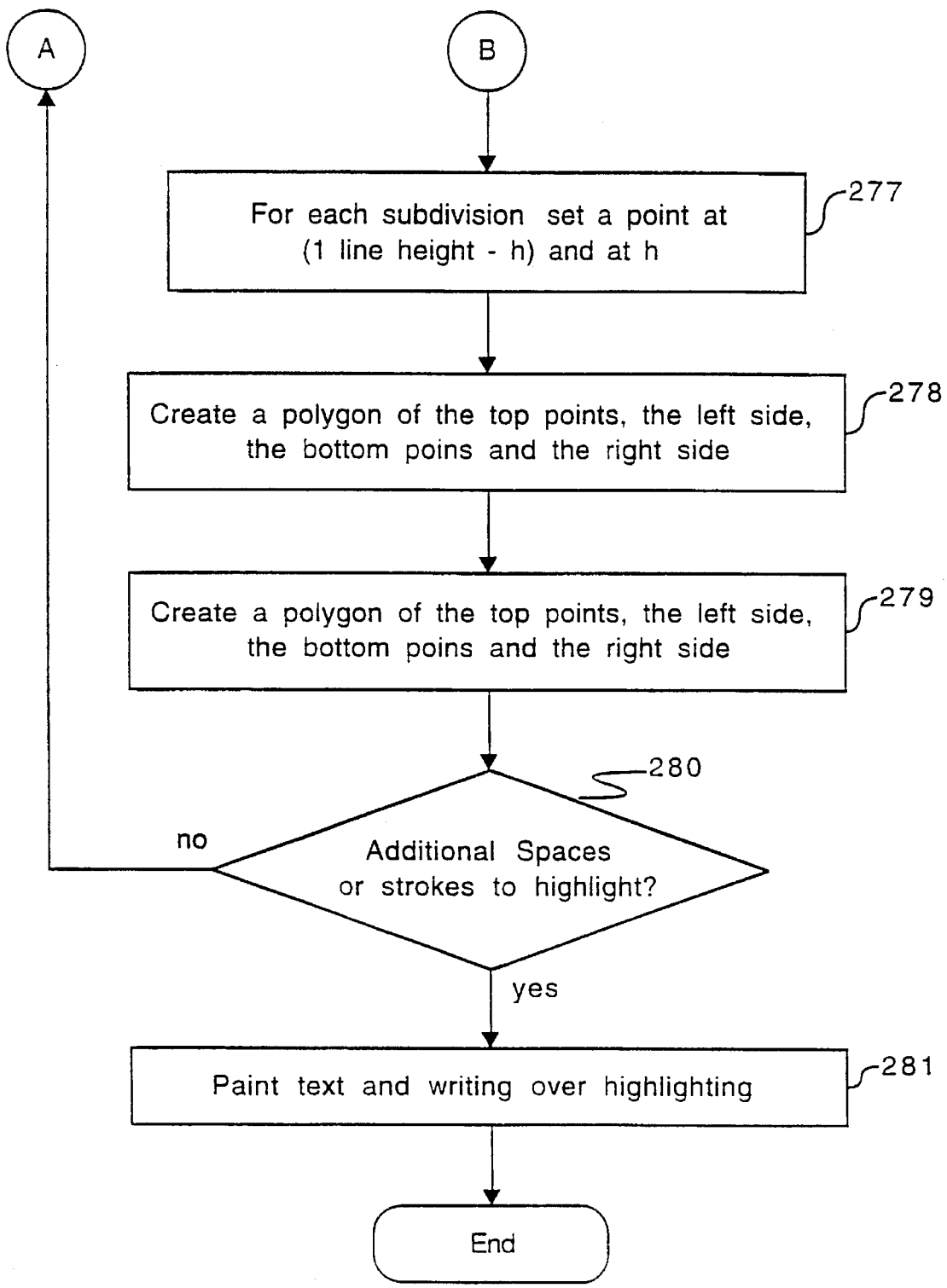

The present invention also includes a method for generating and maintaining highlights on strokes input and displayed by the system. The preferred method for highlighting is particularly advantageous because the visual representation is such that a selection rectangle can be shown and distinguished from the highlighting; the highlighting has jaggedness that looks hand drawn; and the highlighting is an attribute applied to text allowing the highlighting to move with the text as it is copied or word wrapped. Referring now to FIGS. 14A and 14B the preferred method for highlighting text will be described. The method begins in step 271 by painting selection rectangles on the display. In step 272, the method retrieves the first word or space to be highlighted. Then in step 273 for the retrieved word or space, a bounding rectangle, that spans the width of the word and is one line in height, is calculated. Next in step 274, the method seeds a random number that is equal to the sum of the X and Y coordinates of the origin of the rectangle. This provides different jaggedness for each line. In step 275, the bounding rectangle is horizontally subdivided at ½nd of line height intervals. Then in step 276, a random number, h, between zero and ⅓ a line height is calculated for each horizontal subdivision. In step 277, two points are set for each subdivision. One point is set at one line height minus h and the other point is set at h. Then in step 278, a polygon is created by connecting the points along the top, the two points on the left side, points along the bottom and the two points on the right side of the bounding rectangle. The polygon is the area on the display that is highlighted. Then in step 280, the method tests whether there are additional words or spaces to highlight. If there are, the method returns to step 272 to process the next word. Otherwise, method moves to step 281 where the text and writing are displayed over the highlighting and the process is complete.

Figure 15:
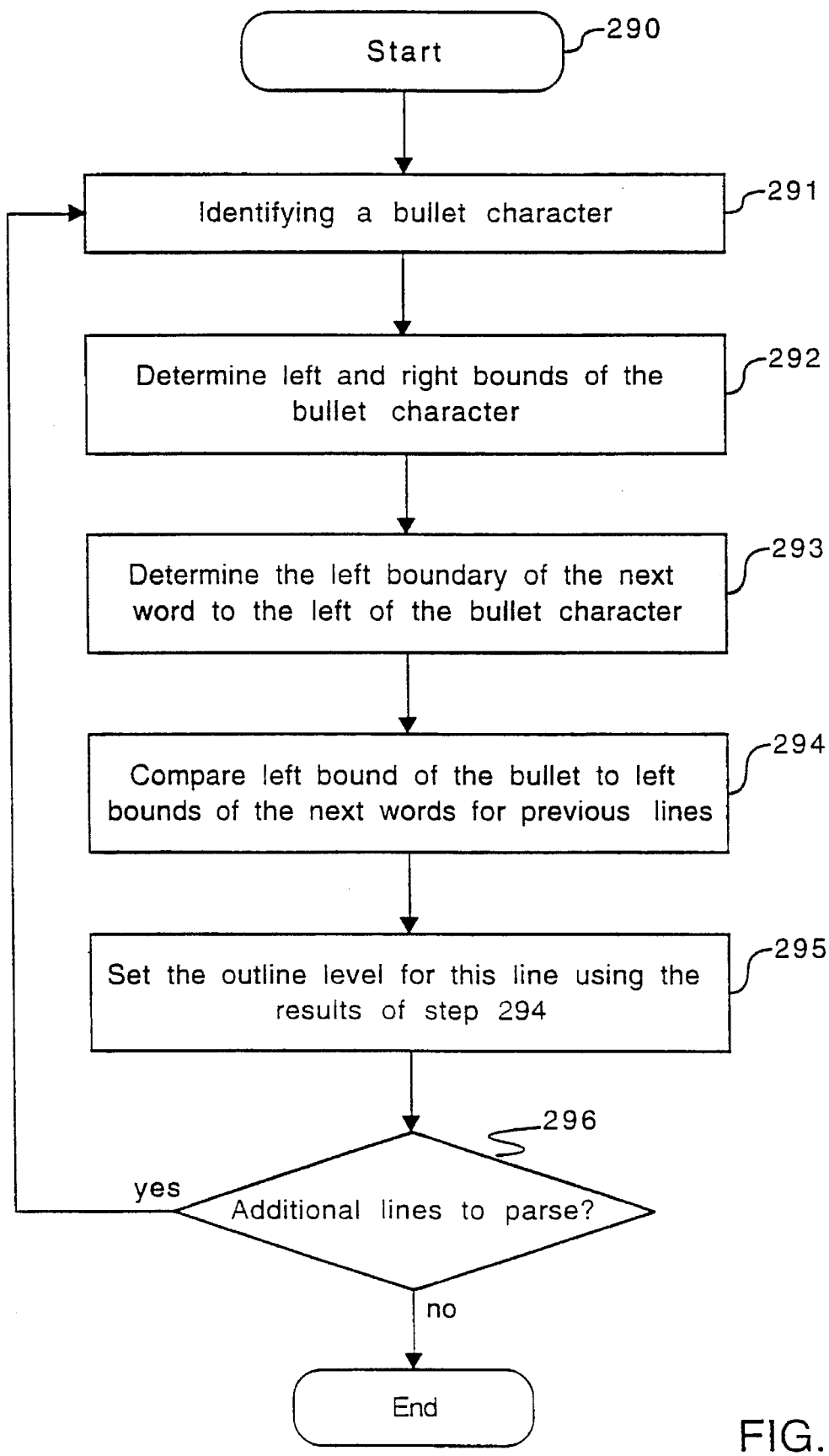
FIG. 15 is a flowchart of the preferred method for automatically determining outline levels for text inputs.

Referring now to FIG. 15, a preferred method for automatically identifying bullet characters and creating hanging indents for outlining functions will be described. The preferred method begins in step 291 by identifying a bullet character. This can be done using conventional character recognition methods. Next, in step 292 the left and right bounds of the bullet character are determined. Then in step 293, the left boundary of the next word to the right of the bullet character are determined. This position is preferably used as the distance of the hanging indent for subsequent lines of the same paragraph. The data of steps 292 and 293 are also stored for use in processing other lines. Next, in step 294, the left boundary of the bullet is compared to the left boundary of the next words for all of the preceding lines. Then in step 295 the outline level and the position for the hanging indent are set using the comparison results of step 295. If the left boundary of the bullet is to the right of the left boundary of the next word of the previous paragraph, then the bullet has a lower level in the outline. If the left boundary of the next word is to the left of the left boundary of the bullet for the previous paragraph, then the bullet has a higher level. If neither of these two conditions is true, then the bullet has the same level in the outline. Finally, the method tests whether there are additional lines to parse. If there are, the method returns to step 291, otherwise the method is completed.

While the present invention has been described with reference to certain preferred embodiments, those skilled in the art will recognize that various modifications may be provided. For example, different algorithms may be used to implement the line, word and paragraph parsing of the present invention. These and other variations upon and modifications to the preferred embodiment are provided for by the present invention which is limited only by the following claims.

Appendix A
Membership Functions

NARROW_WIDTH

| Point 1 | −32768 |
|---|---|
| Point 2 | −32768 |
| Point 3 | 3 |
| Point 4 | 8 |

CHARACTER_WIDTH

| Point 1 | −32768 |
|---|---|
| Point 2 | −32768 |
| Point 3 | CHAR_WIDTH*1.5 |
| Point 4 | CHAR_WIDTH*4 |

NOT_CHARACTER_WIDTH

| Point 1 | CHAR_WIDTH*2 |
|---|---|
| Point 2 | CHAR_WIDTH*4 |
| Point 3 | 32767 |
| Point 4 | 32767 |

CHARACTER_DISTANCE

| Point 1 | −32767 |
|---|---|
| Point 2 | −32767 |
| Point 3 | CHAR_DIST |
| Point 4 | CHAR_DIST*1.5 |

NOT_CHARACTER_WIDTH

| Point 1 | CHAR_WIDTH*1.25 |
|---|---|
| Point 2 | CHAR_WIDTH*2 |
| Point 3 | 32767 |
| Point 4 | 32767 |

CHARACTER_DELTA

| Point 1 | −32767 |
|---|---|
| Point 2 | −32767 |
| Point 3 | CHAR_DELTA |
| Point 4 | WORD_DELTA |

WORD_DELTA

| Point 1 | CHAR_DELTA |
|---|---|
| Point 2 | WORD_DELTA |

-continued

| Point 3 | 32767 |
|---|---|
| Point 4 | 32767 |

OVERLAPPING

| Point 1 | −32767 |
|---|---|
| Point 2 | −32767 |
| Point 3 | −2 |
| Point 4 | 8 |

NOT_OVERLAPPING

| Point 1 | 0 |
|---|---|
| Point 2 | 10 |
| Point 3 | 32767 |
| Point 4 | 32767 |

ENTRY_MERGE

| DEFINITELY_SPLIT | −32768 |
|---|---|
| SPLIT | −32768/2 |
| JOIN | +32767/2 |
| DEFINITELY_SPLIT | +32767 |

Appendix B
Rules for Fuzzy Join

```
// Rule 0
If Rule     (ENTRY_DELTA, WORD_DELTA),
Then Rule   (ENTRY_MERGE, DEFINITELY_SPLIT),
// Rule 1
If Rule     (ENTRY_OVERLAP, OVERLAPPING),
ThenRule    (ENTRY_MERGE, DEFINITELY_JOIN),
// Rule 2
If Rule     (ENTRY_WIDTH, CHARACTER_WIDTH),
AndIfRule   (PREV_ENTRY_WIDTH,
            CHARACTER_WIDTH),
AndIfRule   (ENTRY_DELTA, CHARACTER_DELTA),
ThenRule    (ENTRY_MERGE, DEFINITELY_JOIN),
// Rule 3
If Rule     (ENTRY_WIDTH, CHARACTER_WIDTH),
AndIfRule   (PREV_ENTRY_WIDTH,
            CHARACTER_WIDTH),
AndIfRule   (ENTRY_DISTANCE,
            CHARACTER_DISTANCE),
ThenRule    (ENTRY_MERGE, JOIN),
// Rule 4
If Rule     (ENTRY_WIDTH, CHARACTER_WIDTH),
AndIfRule   (PREV_ENTRY_WIDTH,
            CHARACTER_WIDTH),
AndIfRule   (ENTRY_DISTANCE,
            NOT_CHARACTER_DISTANCE),
ThenRule    (ENTRY_MERGE, SPLIT),
// Rule 5
If Rule     (ENTRY_WIDTH, CHARACTER_WIDTH),
AndIfRule   (PREV_ENTRY_WIDTH,
            NOT_CHARACTER_WIDTH),
AndIfRule   (ENTRY_DELTA, CHARACTER_DELTA),
ThenRule    (ENTRY_MERGE, JOIN),
// Rule 6
If Rule     (ENTRY_WIDTH,
            NOT_CHARACTER_WIDTH),
AndIfRule   (PREV_ENTRY_WIDTH,
            CHARACTER_WIDTH),
AndIfRule   (ENTRY_DELTA, CHARACTER_DELTA),
ThenRule    (ENTRY_MERGE, JOIN),
// Rule 9
If Rule     (ENTRY_WIDTH,
            NOT_CHARACTER_WIDTH),
If Rule     (PREV_ENTRY_WIDTH,
            NOT_CHARACTER_WIDTH),
AndIfRule   (ENTRY_OVERLAP, NOT_OVERLAPPING),
```

-continued

| | |
|---|---|
| ThenRule // Rule 10 | (ENTRY_MERGE, SPLIT), |
| | |
| If Rule | (ENTRY_WIDTH, NARROW_WIDTH), |
| AndIfRule | (PREV_ENTRY_WIDTH, CHARACTER_WIDTH), |
| AndIfRule | (ENTRY_DISTANCE, CHARACTER_DISTANCE), |
| ThenRule // Rule 11 | (ENTRY_MERGE, DEFINITELY_JOIN), |
| | |
| If Rule | (ENTRY_WIDTH, NARROW_WIDTH), |
| AndIfRule | (ENTRY_DELTA, CHARACTER_DELTA), |
| ThenRule | (ENTRY_MERGE, DEFINITELY_JOIN), |

What is claimed is:

1. A computerized method for automatically selecting a layer with which to process an input ink stroke representation in a system having a display device, a drawing layer that processes input as drawing strokes and a writing layer that processes input as writing strokes, the drawing and writing layers corresponding to a same area shown on the display device, said method comprising the steps of:

determining bounds of the input ink stroke representation;

determining whether the bounds of the input stroke representation are greater than a predeterdmined size;

processing the input ink stroke representation with the drawing layer if the bounds of the input stroke representation are great than said predetermined side;

processing the input stroke representation with the writing layer if the bounds of the input ink stroke representation are not greater than said predetermined size;

determining whether the input ink stroke representation is a special case character; and processing the input ink stroke representation using the operating system, wherein the special case character is processed by applying fuzzy logic to determine whether the input ink stroke representation is a tap gesture or a part of an ink character.

2. A computerized method for processing ink stroke representations into groups for manipulation as words, lines and paragraphs, said method comprising the steps of:

grouping the ink stroke representations into a plurality of line groups based on a position of each ink stroke representation;

combining the ink stroke representations of a selected line group into at least one word group;

dividing a display area on a screen into a first zone, a second zone, and a third zone, the first, second and third zones extending in a first direction substantially perpendicular to a second direction in which the plurality of line groups extend;

determining placement of the ink stroke representations for a first line group;

determining placement of the ink stroke representations for a second line group, said second line group adjacent to and following the first line group; and combining the first and second line groups into a paragraph group if the first line group has strokes in third zone and the second line group has strokes in the first zone; and forming separate paragraphs with the first and second line groups if the first line group does not have a stroke in third zone or the second line group does not have a stroke in the first zone.

3. The method of claim 2, wherein the step of grouping the ink stroke representations into a plurality of line groups based on a position of each ink stroke representation further comprises the steps of:

defining a plurality of line areas on a screen display;

determining a bounding box for each of the ink stroke representations;

dividing the plurality of ink stroke representations into word groups where each stroke in a word group has a bounding box within a predetermined distance of at least one other ink stroke representation in the word group;

selecting a word group of ink stroke representations;

calculating a weighted center for the selected word group based upon the bounding boxes of the ink stroke representations of selected word group; and associating the ink stroke representations in the selected word group with the line area in which the weighted center for the selected word lies.

4. The method of claim 2, wherein the step of combining the ink stroke representations of the selected line group into at least one word group further comprises the steps of:

a) retrieving a first ink stroke representation associated with a line area;

b) calculating bounding bands for the first ink stroke representation;

c) forming a first word from the first stroke and the bounding bands of the first stroke;

d) retrieving a second ink stroke representation;

e) calculating bounding bands for the second ink stroke representation;

f) comparing the first ink stroke representation to the second ink stroke representation band by band;

g) grouping the first ink stroke representation and the second ink stroke representation together as a first word, if any of the bounding bands of the first ink stroke representation are within a predetermined distance of corresponding bounding bands of the second ink stroke representation;

h) grouping the first ink stroke representation as the first word and the second ink stroke representation as a second word, if none of the bounding bands are within a predetermined distance of corresponding bounding bands of the second ink stroke representation.

5. A computerized method for grouping a plurality of ink stroke representations and associating them with a line area, said method comprising the steps of:

defining a plurality of line areas on a screen display;

determining a bounding box for each of the ink stroke representations;

dividing the plurality of ink stroke representations into word groups where each ink stroke representation in a word group has a bounding box within a predetermined distance of at least one other ink stroke representation in the word group;

selecting a word group of ink stroke representations;

calculating a weighted center for the selected word group based upon the bounding boxes of the ink stroke representations of the selected word group; and associating the ink stroke representations in the selected word group with the line area in which the weighted center for the selected word lies.

6. The method of claim 5, wherein the step of associating the ink stroke representations in the selected word group further comprises the steps of:

determining whether a first ink stroke representation in the selected word group was made within a predefined distance of other ink stroke representations that have been processed with the writing layer;

processing the first ink stroke representation with the writing layer if the first ink stroke representation was made within a predefined distance of other ink stroke representations that have been processed with the writing layer; and processing the first ink stroke representation using the operating system if the first ink stroke representation was not made within a predefined distance of other ink stroke representations that have been processed with the writing layer.

7. The method of claim 5, wherein the step of associating the ink stroke representations in the selected word group further comprises the steps of:

identifying the selected word group as a punctuation mark;

determining whether the selected word group is positioned within a predetermined tolerance of the bottom right corner of an existing word associated with a previous line area adjacent to the line area in which the weighted center lies;

associating the selected word with the previous line area, if the selected word is positioned within a predetermined-tolerance of the bottom right corner of the existing word; and associating the selected word with the line area in which the weighted center lies if the selected word is not positioned within the predetermined tolerance of the bottom right corner of the existing word.

8. A computerized method for processing a plurality of ink stroke representations associated with a line area into words, said method comprising the steps of:

a) retrieving a first ink stroke representation associated with the line area;

b) calculating bounding bands for the first ink stroke representation;

c) retrieving a second ink stroke representation d) calculating bounding bands for the second ink stroke representation;

e) comparing the first ink stroke representation to the second ink stroke representation band by band;

f) grouping the first ink stroke representation and the second ink stroke representation together as a first word, if any of the bounding bands of the first ink stroke representation are within a predetermined distance of corresponding bounding bands of the second ink stroke representation;

g) grouping the first ink stroke representation as the first word and the second ink stroke representation as a second word, if none of the bounding bands of the first ink stroke representation are within a predetermined distance of corresponding bounding bands of the second ink stroke representation.

9. The method of claim 8, further comprising the steps of:

comparing the first word to an existing word already formed on the line area; and grouping the ink stroke representations forming the first word and the ink stroke representations forming the existing word together into a single new word, if any of the bounding bands of ink stroke representations forming the first word are within a predetermined distance of corresponding bounding bands of ink stroke representations forming the existing word.

10. The method of claim 8, wherein step g further comprises the steps of:

retrieving an third ink stroke representation associated with the line area;

calculating bounding bands for the third ink stroke representation;

comparing bounding bands of the third ink stroke representation to the bounding bands of the first word band by band;

grouping the third ink stroke representation and the first word together as an increased sized first word, if any of the bounding bands of the third ink stroke representation are within a predetermined distance of corresponding bounding bands of the first word; and grouping the third ink stroke representation as a second word if none of the bounding bands of the third ink stroke representation are within a predetermined distance of corresponding bounding bands of the first word.

11. A computerized method for combining a plurality of strokes associated with a selected line area together, said method comprising the steps of;

calculating a leftmost and a rightmost coordinate for a first stroke associated with the selected line area and a leftmost a rightmost coordinate for a second stroke associated with the selected line area;

calculating a center point for the first stroke and a center point for the second stroke;

comparing the center point of the first stroke to the leftmost and rightmost coordinates of the second stroke, and comparing the center point of the second stroke to the leftmost and rightmost coordinates of the first stroke; and combining the first stroke and the second stroke together as a single word group if the center point of the first stroke is horizontally between approximately the leftmost and the rightmost coordinates of the second stroke or if the center point of the second stroke is horizontally between approximately the leftmost and the rightmost coordinates of the first stroke;

inputting a gesture over a word, the gesture indicating the word is to be split into two words;

identifying a hot point for the gesture;

determining the center point of each stroke forming the word;

forming a left word with the strokes forming the word that have a center point to the left of the hot point of the gesture;

forming a right word with the strokes forming the word that have a center point to the right of the hot point of the gesture; and inserting a predetermined amount of space between the right word and the left word.

12. The method of claim 11, wherein the gesture is a stroke including a downward portion and rightward portion.

13. The method of claim 11, wherein the hot point of the gesture is the starting point from which the stroke forming the gesture begins.

14. A computerized method for grouping a plurality of lines of ink stroke representations into paragraph groups, said method comprising the steps of:

dividing a display area on a screen into a left zone, a center zone and a right zone, the left, center, and right zones extending across the plurality of lines;

determining a placement of the ink stroke representations on a first line;

determining a placement of the ink stroke representations on a second line, said second line adjacent to and following the first line; and grouping the first line and the second line together as a paragraph group if the first line has ink stroke representations in the right zone and the second line has ink stroke representations in the left zone.

15. The computerized method of claim 14, wherein the left, center, and right zones extend substantially vertically across the display area.

16. The computerized method of claim 14, wherein the left, center, and right zones extend substantially horizontally across the display area.

17. The computerized method of claim 14, wherein the left, center, and right zones are not visible on the display area.

18. The computerized method of claim 14, wherein the left, center, and right zones are visible on the display area.

19. A computerized method for automatically categorizing a stroke as a line-type or shape-type, said method comprising the steps of:

determining a bounding box for the stroke;

determining a length, L, of a longest side of the bounding box;

determining a width, W, of an adjacent side the bounding box;

determining a position of a beginning point of the stroke;

determining a position of an ending point of the stroke;

setting the stroke to be a line-type if the position of the beginning point is within a predetermined percentage of L and W of a first corner of the bounding box, and the position of the end point is within the predetermined percentage of L and W of a second corner of the bounding box, and wherein the first and second corners are opposite corners.

20. The method of claim 19, wherein the predetermined percentage is less than 25%.

21. A computerized method for automatically categorizing a plurality of strokes as a line-type or shape-type object, said method comprising the steps of:

identifying the plurality of strokes for categorization;

defining a single bounding box surrounding the identified plurality of strokes;

determining a length, L, of a longest side of the bounding box;

determining a width, W, of an adjacent side the bounding box;

determining a position of a beginning point for each stroke in the identified plurality of strokes;

determining a position of an ending point for each stroke in the identified plurality of strokes;

setting the identified plurality of strokes to be a line-type object of for any stroke, the position of the stroke's beginning point is within a predetermined percentage of L and W of a first corner of the bounding box, and the position of the stroke's end point is within the predetermined percentage of L and W of a second corner of the bounding box, and wherein the first and second corners are opposite corners.

22. The method of claim 21, wherein the predetermined percentage is less than 25%.

23. A computerized method for automatically resizing or rotating a displayed position of a drawing figure on a display device based upon a single input by the user, said method comprising the steps of:

determining a handle of an associated figure selected by the user;

determining a direction in and an end point to which the handle is dragged by the user;

determining a bounding box for the associated figure and a closest side of the bounding box;

determining whether to rotate or resize the associated figure depending on the direction in which the handle is dragged;

rotating the figure such that the handle is aligned with the endpoint if the direction the handle is dragged is substantially parallel to the closest side of the bounding box; and resizing the figure such that the handle is aligned with the endpoint if the direction the handle is dragged is substantially perpendicular to the closest side of the bounding box.

24. A computerized method for automatically identifying special characters that delineate outline-type formatting of paragraphs and inserting hanging indents, said method comprising the steps of:

retrieving words on a line;

identifying a bullet character;

determining a left boundary and a right boundary of the bullet character;

determining a left boundary of a first word to the right of the bullet character;

comparing the left boundary of the bullet character to leftmost boundaries of other words on preceding lines of a previous paragraph; and setting an outline level based on the comparing step and a position for the hanging indent at the left boundary of the first word.

25. The computerized method of claim 24 further comprising the steps of:

storing the left and right boundaries of the bullet character and the left boundary of the first word; and repeating the steps of retrieving, identifying, determining the left boundary and right boundary, determining the left boundary of the first word, comparing, setting, and storing for each additional line of words.

26. A computerized method for combining a plurality of strokes associated with a selected line area together as words, said method comprising the steps of:

grouping the plurality of strokes into characters;

determining measurement parameters about the characters including average character width;

defining a membership function for joining two adjacent characters together as a word from the measurement parameters;

retrieving a first character;

retrieving a second character that is adjacent to the first character;

determining measurement parameters between the first character and the second character;

combining the first and second characters into a word using the defined membership function and the measurement parameters between the first character and the second character.

27. The computerized method of claim 26, wherein the step of grouping the plurality of strokes into characters comprises the substeps of:

calculating a leftmost and a rightmost coordinate of each stroke;

averaging the leftmost and rightmost coordinates to get a center point for each stroke;

combining a first and second stroke together as a character if the center point of the first stroke is within approximately the leftmost and the rightmost coordinates of the second stroke; and combining the first and second strokes together if the center point of the second stroke is within approximately the leftmost or rightmost coordinates of the first stroke.

28. The computerized method of claim 26, wherein the measurement parameters about the characters also include the average calculated distance between adjacent character center points; and the average calculated space between words.

29. The computerized method of claim 28, wherein the measurement parameters are calculated using fuzzy membership function and a center of gravity calculation.

30. The computerized method of claim 26, wherein the membership function includes:

a Narrow Width membership function for discriminating very narrow characters;

a Character Width membership function for determining a typical character;

a Not Character Width membership function for determining if a stroke is too wide to be a character;

a Character Distance and Not Character Width membership functions for distances between characters;

a Character Delta and Word Delta membership functions for indicating whether characters form a word;

an Overlapping and Not Overlapping membership functions for determining whether the characters are overlapping; and an Entry Merge membership table for determining whether to clump characters as words.

31. The computerized method of claim 30, wherein:

the measurement parameters about the characters include waviness of the stroke, where the waviness is the number of times the angle of a stroke polyline changed from heading up to heading down; and the membership function includes Cursive and Printed membership functions for determining whether the characters are in cursive handwriting or printed handwriting.

32. The computerized method of claim 26, further comprising the step of calculating an overlap between the first character and the second character; a character width of the first character and a character width of the second character.

33. The computerized method of claim 26, wherein the characters are combined by proceeding from left to right in the line and analyzing two characters at a time.

34. The computerized method of claim 26, further comprising a step of merging the word produced by the combining step with an existing word already present on the line area by:

calculating a leftmost and a rightmost coordinate of the existing word;

determining a center point for the word produced by the combining step; and combining into a single new word the word produced by the combining step and the existing word if the center point of the word produced by the combining step is between approximately the leftmost and the rightmost coordinates of the existing word.

35. A computerized method for generating highlighting on strokes input and displayed by a computer system, said method comprising the steps of:

retrieving strokes selected for highlighting;

defining a bounding rectangle for the strokes, the bounding rectangle having a top, a bottom, a left side and a right side;

horizontally subdividing the bounding rectangle at intervals having at least ¼ of line height;

generating a random number, h, between zero and ⅓ a line height for each horizontal subdivision;

setting a point at one line height minus h and another point at h for each subdivision;

creating a polygon by connecting the points proximate the top, the two points proximate the left side, points proximate the bottom and the two points proximate the right side of the bounding rectangle; and displaying an area enclosed by the polygon in a visually distinct manner.

36. The computerized method of claim 35, further comprising the steps of testing whether there are additional words or spaces to highlight and repeating the steps of defining, horizontally subdividing, generating, setting, creating and displaying for each additional word to highlight.

37. The computerized method of claim 35, wherein the bounding rectangle is horizontally subdivided by intervals having about 1/32 of a line height.

38. A computerized method for grouping a plurality of lines of ink stroke representations into paragraph groups, said method comprising the steps of:

dividing a display area on a screen into a first zone, a second zone, a third zone and a fourth zone, the first, second, third and fourth zones extending in a direction substantially perpendicular a direction in which the lines extend;

determining placement of the ink stroke representations on a first line;

determining placement of the ink stroke representations on a second line, said second line following the first line; and determining placement of the ink stroke representations on a third line, said third line following the second line;

grouping the first line and the second line together as a paragraph group if the first line has ink stroke representations in the first and fourth zones and the second line has ink stroke representations in the first zone; and grouping the third line with the first line and the second line as a paragraph group if the second line has ink stroke representations in the fourth zone and the third line has ink stroke representations within a predetermined distance of a leftmost ink stroke representation of the second line.

39. The method of claim 38, wherein:

the first zone extends from a left edge of the display area to about ⅓ of a width of the display area from the left edge;

the second zone extends from ⅓ of the width of the display area from the left edge to about a middle of the display area;

the third zone extends from about the middle of the display area to about ⅔ the width of the display area from the left edge; and the fourth zone extends from the right edge of display area to the right about ⅓ the width of the display area.

40. The method of claim 48, further comprising the steps of:

performing character recognition on a first character in the first line area;

determining whether the first character in the first line area is a valid bullet character;

determining the position of the first character grouping the first line area and the second line area together as a paragraph group if (1) the first character in the first line is a valid bullet character, (2) the bullet character is positioned in the first or second zone, (3) the first line has ink stroke representations in the fourth zone, and (4) the second line has ink stroke representations in the first or second zone; and grouping the third line area with the first line area and the second line area as a paragraph group if the second line area has ink stroke representations in the fourth zone and the third line area has ink stroke representations within a predetermined distance of a leftmost ink stroke representations of the second line area.

41. The method of claim 40, further comprising the steps of:

determining a left edge of the second line area;

determining a left edge of a following word in the first line area, the following word being the word immediately to the right of the bullet character; and adjusting the left edge of the second line area to be about the same as the left edge of the following word.

42. A computerized method for grouping a plurality of lines of ink stroke representations into paragraph groups, said method comprising the steps of:

defining on a display area of a screen a plurality of line areas extending in a first direction;

dividing the display area of the screen into a first zone and a second zone, the first and second zones extending in a second direction substantially perpendicular to the first direction and across the plurality of line areas;

determining placement of the ink stroke representations in a first line area;

determining placement of the ink stroke representations in a second line area, said second line area adjacent and following the first line area;

grouping the ink stroke representations associated with the first line area and the second line area together as a paragraph group if the first line area has ink stroke representations in the second zone and the second line area has ink stroke representations in the first zone; and grouping the ink stroke representations associated with the first line area as a first paragraph group and the ink stroke representations associated with the second line area as a second paragraph group if the first line area does not have ink stroke representations in the second zone or the second line area does not have ink stroke representations in the first zone.

43. A computerized method for grouping a plurality of lines of ink stroke representations into paragraph groups, said method comprising the steps of:

identifying a current line;

performing character recognition on a first character in the current line;

determining whether the first character in the current line is a valid bullet character; and creating a new paragraph group beginning with the current line if the first character in the current line is a valid bullet character.

* * * * *